United States Patent
Li et al.

(10) Patent No.: US 11,636,083 B2
(45) Date of Patent: Apr. 25, 2023

(54) DATA PROCESSING METHOD AND APPARATUS, STORAGE MEDIUM AND ELECTRONIC DEVICE

(71) Applicant: Tencent Technology (Shenzhen) Company Limited, Shenzhen (CN)

(72) Inventors: Haixiang Li, Shenzhen (CN); Sheng Ye, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 11 days.

(21) Appl. No.: 17/014,967

(22) Filed: Sep. 8, 2020

(65) Prior Publication Data

US 2020/0409925 A1  Dec. 31, 2020

Related U.S. Application Data

(63) Continuation of application No. PCT/CN2019/092459, filed on Jun. 24, 2019.

(30) Foreign Application Priority Data

Aug. 16, 2018  (CN) .......................... 201810935478.1

(51) Int. Cl.
*G06F 16/22* (2019.01)
*G06F 16/23* (2019.01)
(Continued)

(52) U.S. Cl.
CPC ........ *G06F 16/2282* (2019.01); *G06F 16/219* (2019.01); *G06F 16/221* (2019.01); *G06F 16/2379* (2019.01); *G06F 16/2474* (2019.01)

(58) Field of Classification Search
CPC .. G06F 16/219; G06F 16/221; G06F 16/2282; G06F 16/2379; G06F 16/2474
See application file for complete search history.

(56) References Cited

U.S. PATENT DOCUMENTS 5,918,225 A * 6/1999 White ................ G06F 16/2237
6,240,428 B1    5/2001 Yeung et al.
(Continued)

FOREIGN PATENT DOCUMENTS

| CN | 103345518 A | 10/2013 |
| CN | 104424287 A | 3/2015 |

(Continued)

OTHER PUBLICATIONS

Tencent Technology, ISR, PCT/CN2019/092459, Sep. 27, 2019, 2 pgs.

(Continued)

*Primary Examiner* — Miranda Le
(74) *Attorney, Agent, or Firm* — Morgan, Lewis & Bockius LLP

(57) ABSTRACT

This application discloses a data processing method and apparatus, a storage medium and an electronic device. The method includes: obtaining, by the electronic device, at least one target row to be cleared at a target time from a data table of a row-oriented database; storing target attribute values recorded in the at least one target row to target pages in a column-oriented database; and clearing the at least one target row after the target time arrives. The application resolves the technical problem that it is difficult to trace historical data in the related data processing technology.

15 Claims, 9 Drawing Sheets

(51) Int. Cl.
*G06F 16/21* (2019.01)
*G06F 16/2458* (2019.01)

(56) References Cited

U.S. PATENT DOCUMENTS

| | | | | |
|---|---|---|---|---|
| 6,820,095 | B1* | 11/2004 | Yeung | G06F 16/217 |
| | | | | 707/642 |
| 8,583,692 | B2* | 11/2013 | Ganesh | G06F 16/284 |
| | | | | 707/693 |
| 8,762,387 | B1* | 6/2014 | Patel | G06F 16/2237 |
| | | | | 707/693 |
| 10,922,296 | B2* | 2/2021 | Gurajada | G06F 11/1471 |
| 2011/0107021 | A1* | 5/2011 | Muthukumarasamy | |
| | | | | G06F 12/0207 |
| | | | | 711/104 |
| 2015/0095307 | A1* | 4/2015 | Bensberg | G06F 16/278 |
| | | | | 707/769 |
| 2015/0213071 | A1 | 7/2015 | Alvey et al. | |
| 2016/0147457 | A1* | 5/2016 | Legler | G06F 3/0653 |
| | | | | 707/601 |
| 2016/0171022 | A1* | 6/2016 | Konik | G06F 16/13 |
| | | | | 707/812 |

FOREIGN PATENT DOCUMENTS

| | | |
|---|---|---|
| CN | 103631937 B | 3/2017 |
| CN | 107092624 A | 8/2017 |
| CN | 107256233 A | 10/2017 |
| EP | 3271840 A1 | 1/2018 |
| WO | WO 2015139193 A1 | 9/2015 |

OTHER PUBLICATIONS

David B. Lomet et al., "High Performance Temporal Indexing on Modern Hardware", 2015 IEEE 31$^{st}$ International Conference on Data Engineering, Apr. 13, 2015, XP032781181, 12 pgs.

Robert Haas, "MVCC and Vacuum", Dec. 18, 2017, XP055800960, 4 pgs., Retrieved from the Internet: https://web.archive.org/web/20171227070416/http://rhaas.blogspot.com/2017/12/mvcc-and-vacuum.html.

Extended European Search Report, 19850450.8, dated May 18, 2021, 10 pgs.

Tencent Technology, WO, PCT/CN2019/092459, Sep. 27, 2019, 4 pgs.

Tencent Technology, IPRP, PCT/CN2019/092459, Feb. 16, 2021, 5 pgs.

Tencent Technology, EP Office Action, EP Patent Application No. 19850450.8, dated Sep. 30, 2022, 9 pgs.

* cited by examiner

DATA PROCESSING METHOD AND APPARATUS, STORAGE MEDIUM AND ELECTRONIC DEVICE

CROSS-REFERENCE TO RELATED APPLICATIONS

This application is a continuation application of PCT Patent Application No. PCT/CN2019/092459, entitled "DATA PROCESSING METHOD AND DEVICE, STORAGE MEDIUM, AND ELECTRONIC DEVICE" filed on Jun. 24, 2019, which claims priority to Chinese Patent Application No. 201810935478.1, entitled "DATA PROCESSING METHOD AND APPARATUS, STORAGE MEDIUM AND ELECTRONIC DEVICE" filed on Aug. 16, 2018, all of which are incorporated by reference in their entirety.

FIELD OF THE TECHNOLOGY

This application relates to the field of computers, and in particular, to a data processing technology.

BACKGROUND OF THE DISCLOSURE

Currently, data is stored in databases. Historical data in a database generally needs to be cleared by using related operations. The foregoing data processing manner causes missing of historical data in the database, resulting in the problem that it is difficult to trace the historical data.

Currently, no effective solution has been provided yet to resolve the foregoing problem.

SUMMARY

Embodiments of this application provide a data processing method and apparatus, a storage medium, and an electronic device, to resolve at least the technical problem that it is difficult to trace the historical data in the related data processing technology.

According to an aspect of the embodiments of this application, a data processing method is provided, applied to an electronic device, the method including: obtaining a plurality of target rows to be cleared at a target time from a data table of a row-oriented database; storing target attribute values recorded in the plurality of target rows in target pages of a column-oriented database; and clearing the plurality of target rows from the data table of the row-oriented database after the target time arrives.

According to another aspect of the embodiments of this application, a data processing apparatus is provided, the apparatus including: a first obtaining unit, configured to obtain at least one target row to be cleared at a target time from a data table of a row-oriented database; a storage unit, configured to store target attribute values recorded in the at least one target row to target pages in a column-oriented database; and a clearing unit, configured to clear the at least one target row after the target time arrives.

According to still another aspect of the embodiments of this application, a non-transitory computer-readable storage medium is further provided, the storage medium storing a plurality of programs that, when executed by a processor of an electronic device, cause the electronic device to perform the foregoing data processing method when being run.

According to still another aspect of the embodiments of this application, an electronic device is further provided, including memory, a processor, and a plurality of programs stored in the memory that, when executed by the processor, cause the electronic device to perform the foregoing data processing method by using the computer program.

In this embodiment of this application, the target row to be cleared in the row-oriented database is dumped to the column-oriented database, to reserve historical data Specifically, a plurality of target rows to be cleared at a target time are obtained from a data table of a row-oriented database; target attribute values recorded in the plurality of target rows are stored to target pages of a column-oriented database; and the plurality of target rows are cleared from the data table of the row-oriented database after the target time arrives. In this way, based on the foregoing row/column dump technology, the data to be cleared in the row-oriented database is dumped to the column-oriented database, to save the historical data in the database, so as to achieve the technical effect of ensuring a complete data transition track, and resolve the technical problem that it is difficult to trace the historical data in the related data processing technology.

BRIEF DESCRIPTION OF THE DRAWINGS

The accompanying drawings described herein are used for providing further understanding of this application, and form a part of this application. Exemplary embodiments of this application and descriptions thereof are used for explaining this application, and do not constitute any inappropriate limitation to this application. In the accompanying drawings.

DESCRIPTION OF EMBODIMENTS

To make a person skilled in the art better understand solutions of this application, the following clearly and completely describes the technical solutions in embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

The terms such as "first" and "second" in the specification, the claims and the foregoing accompanying drawings of this application are intended to distinguish between similar objects, but are not necessarily used for describing a specific sequence or a chronological order. It is to be understood that the data termed in such a way are interchangeable in proper circumstances, so that the embodiments of this application described herein can be implemented in orders other than the order illustrated or described herein. Moreover, the terms "include", "contain" and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
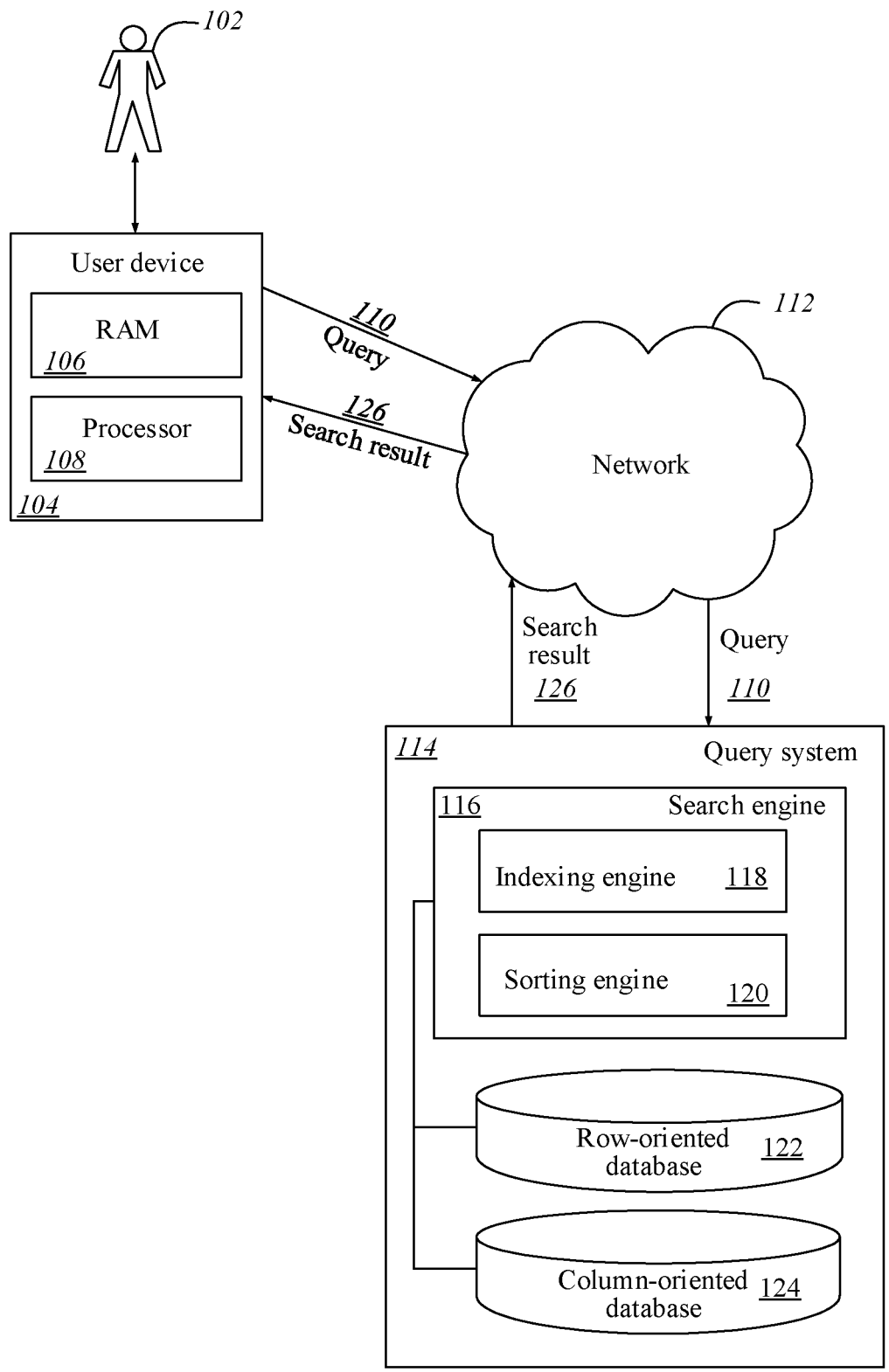
FIG. 1 is a schematic diagram of an application environment of a data processing method according to an embodiment of this application.

According to one aspect of the embodiments of this application, a data processing method is provided. Optionally, the data processing method may be, but is not limited to being applied to an application environment shown in FIG. 1. As shown in FIG. 1, a user device 104 used by a user 102 includes: a random access memory (RAM) 106 and a processor 108. The user 102 may transmit a query request 110 to a query system 114 through a network 112 by using the user device 104. A search engine 116 in the query system 114 includes: an indexing engine 118 and a sorting engine 120. After receiving the query request 110, the query system may query a row-oriented database 122 and a column-oriented database 124 according to the query request 110, to obtain a query result 126, and return the query result 126 to the user device 104 through the network 112.

For data processing on the query system 114, each node device in the system may obtain at least one target row to be cleared at a target time from a data table of the row-oriented database 122, store target attribute values recorded in the at least one target row to target pages in the column-oriented database 124, and clear the at least one target row after the target time arrives.

Optionally, the user device 104 may include, but is not limited to: a mobile phone, a tablet computer, a desktop computer, and the like. The query system 114 may include, but is not limited to at least one of the following: a distributed database system (each node device thereof uses the data processing method in this application), a relational database system based on multi-version concurrency control (MVCC for short), a non-relational database system based on the MVCC, and the like. The foregoing network may include, but is not limited to a wireless network, or a wired network. The wireless network includes: Bluetooth, WI-FI, and another network implementing wireless communication. The wired network may include, but is not limited to: a local area network, a metropolitan area network, and a wide area network. The foregoing query server may include, but is not limited to at least one of the following: a personal computer (PC), and another device for a computing service. The foregoing is merely an example, and this embodiment is not limited thereto.

Figure 2:
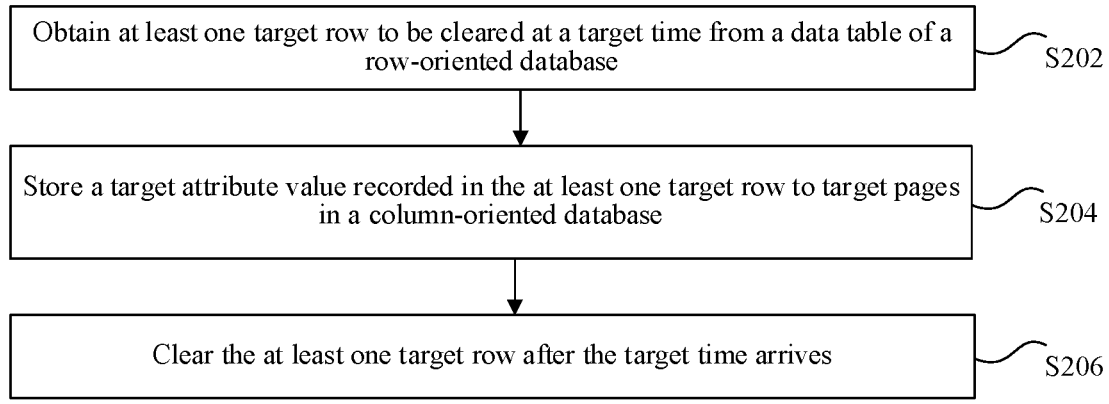
FIG. 2 is a schematic flowchart of an optional data processing method according to an embodiment of this application.

Optionally, in this embodiment, in an optional implementation, as shown in FIG. 2, the foregoing data processing method is applied to an electronic device. The electronic device may be a terminal device, or may be a server. The data processing method may include the following steps:

S202. Obtain a plurality of target rows to be cleared at a target time from a data table of a row-oriented database.

S204. Store target attribute values recorded in the plurality of target rows in target pages of a column-oriented database.

S206. Clear the plurality of target rows from the data table of the row-oriented database after the target time arrives.

Optionally, the foregoing data processing method may be, but is not limited to being applied to the following application scenarios: recording user behaviors, recording accounting changes of an account, recording stock exchange records, recording meteorological monitoring data, and other scenarios where a data change history needs to be recorded.

A scenario of recording accounting changes of an account is used as an example. For a user's online account, the user performs activities such as charging and consumption based on the online account. If account information only records a current account balance, when a problem occurs in accounting later, it is likely that the user cannot query historical accounting changes of the account and therefore cannot know a reason and an occurrence time of the accounting problem. If change information of all accounts is dumped in the data processing manner in this application, all transaction states of the accounts within a period from opening to closing of the accounts are recorded. Once an accounting problem occurs, tracking and positioning may be performed according to recorded historical accounting change information immediately. During specific implementation, the server may obtain at least one target row to be cleared (the historical accounting change information) at a target time from a data table (storing accounting information of a user) of a row-oriented database, store target attribute values recorded in target columns of the at least one target row to target pages in a column-oriented database, where target attribute values recorded in the same target column of the at least one target row may be recorded in at least one of the target pages in the column-oriented database, and clear the at least one target row after the target time arrives.

In the related art, the historical data in the database is generally directly cleared. However, the data change history is of great significance in many scenarios, for example, monitoring historical bill change information of a depositor by a bank, monitoring weather change information by a meteorological department, and displaying historical transaction information on a stock market. The foregoing data processing method used in the related art causes missing of the historical data in the database, making it difficult to trace the historical data. In this application, the at least one target row to be cleared at the target time is obtained from the data table of the row-oriented database. The target attribute values recorded in the at least one target row are stored to the target page in the column-oriented database. The at least one target row is cleared after the target time arrives. In this way, the historical data in the database is saved, integrity of change data of the historical data is ensured, and the technical problem that it is difficult to trace the historical data in the data processing technology is resolved.

Optionally, to-be-dumped data in the row-oriented database (also referred to as a row store database) may be located in internal memory of a node device. The row store database stores data (for example, data of the latest version) in a data table in a form of a row store. The row store database may include, but is not limited to: a PostgreSQL, a MySQL, and the like. In the row store database, data update is performed in a periodic triggering or event triggering manner. Types of attributes of the row store may be inconsistent, and different column widths (that is, column sizes) need to be assigned to different attributes. Due to the existence of attribute type inconsistency, row alignment needs to be ensured.

Optionally, a lifecycle track of data may be identified by using state attributes of the data. A lifecycle of the data may be divided into three stages. Each stage describes a different state attribute of the data, to identify a state of the data in the lifecycle track. The state attributes corresponding to the three stages are as follows:

(1) Current state: A state of data in a current stage is referred to as a current state, and data in the current state is the latest version of a data item.

(2) Historical state: A state of data in a history stage is referred to as a historical state. A value of data in the historical state is an old value instead of a current value. There may be a plurality of historical states of a data item, which reflect a state change process of the data. The data in the historical state can be read only, and is not allowed to be modified or deleted.

(3) Transitional state: A state of data that is in transition from the current state to the historical state is referred to as a transitional state. Data in the transitional state (referred to as half-life data) is neither the latest version nor a historical state version of a data item, but is in the process of transition from the current state to the historical state.

The three states cover the entire lifecycle of a data item, and are together referred to as a data full-state, and a data item having the three states is referred to as full-state data. Under a Multi-Version Concurrency Control (MVCC) mechanism, all the three states of data exist, but under a non-MVCC mechanism, only the historical state and the current state of data exist.

For example, there is an account table Account (ID int, Name char (8), Balance int, Note text). The account table includes four attribute columns, which are: account, name, balance, and note respectively. The table is used for recording changes of a user account balance. One balance change generates one record (corresponding to a row in the account table). Existing data of a user is (10, James, 1000, Create account). The user has a balance change at a specific moment, an account balance is reduced by 100, and 'consume 100' is noted in the note. In this case, an update operation needs to be performed on the database once, and data of the latest version stored in the row store database is (10, James, 900, consume 100), which is the current-state data. In a process of updating the data of the latest version, (10, James, 1000, Create account) is transitional-state data. After the update is complete, (10, James, 1000, Create account) is historical-state data.

Optionally, the data may have a bi-temporal attribute: a valid time attribute, and a transaction time attribute. The valid time attribute represents a time-attribute condition of an object represented by the data. For example, Kate went to middle school from 2000 Sep. 1 to 2003 Jul. 30, and this period of time is a valid time. The transaction time attribute represents at a moment when a specific state of the data occurs, the data has a temporal attribute thereof. That is, the database system performs a specific operation at a specific time; an operation is encapsulated as a transaction within the database system, and the transaction has atomicity. A transaction identifier may be used for identifying a transaction time attribute of a piece of data. In terms of the form, the valid time attribute and the transaction time attribute are represented in a data model by common user-defined fields, and are described only by using specific keywords, to allow a database engine to perform constraint checking and assignment.

Optionally, in this embodiment, the at least one target row to be cleared at the target time in the data table of the row-oriented database may be obtained. That is, one target row to be cleared in the data table of the row-oriented database may be obtained, or a plurality of target rows to be cleared in the data table of the row-oriented database may be obtained. Generally, a plurality of target rows need to be obtained.

Specifically, the target row to be cleared in the data table of the row store database may be identified by setting a ready-to-clear identifier in the row store database, or the target row to be cleared in the data table of the row store database may be identified by placing the target row to be cleared to a specific storage position. In addition, the target row to be cleared in the data table of the row store database may alternatively be identified by other means.

For example, when performing a data update operation, a database supporting the MVCC generates old data of a plurality of versions, that is, historical-state data in a full-temporal data model. A current method in a database management system is periodic deletion. When performing an update/delete operation, the row store database does not clear existing data directly, but makes a ready-to-clear mark. The PostgreSQL sets a VM file for each table, to identify expired tuples. The MySQL uses a history list of the MVCC to identify expired tuples. Multi-version data of the PostgreSQL is stored in a data page, and multi-version data of the My SQL is stored in an UNDO rollback segment.

Optionally, the historical data (historical-state data, that is, the target row to be cleared) in the row store database may be cleared in a plurality of manners. The clear operation may be performed periodically, or may be performed when triggered by an event (upon reception of a clear instruction), and so on. The target time is determined according to the clearing manner of the historical data. This is not limited in this embodiment.

For example, when performing a VACUUM operation, the PostgreSQL clears expired tuples for each table according to the VM file. A purge thread of the MySQL scans the history list of the MVCC, and clears expired data that is not referenced by other transactions and does not need to roll back. The VACCUM operation of the PostgreSQL and the purge operation of the MySQL are performed periodically by default. Historical data of information changes, for example, data related to accounting, is equally important as current data. Therefore, the historical data is also expected to be saved, instead of being cleared.

Optionally, the operation of obtaining a target row to be cleared may be performed before the target row is cleared. Specifically, before the target row to be cleared is cleared, the target row to be cleared may be first obtained, and the operation of clearing the target row to be cleared is then performed. The operation of obtaining a target row to be cleared may be started periodically based on a timing mechanism (periodic obtaining). A timing period may be dynamically adjusted as a parameter. This is not limited in this embodiment.

For example, the PostgreSQL may perform a dump process before the VACUUM operation. The VACUUM operation does not clear the historical state version but dumps the historical state version. The MySQL may perform the dump process before the purge operation.

Optionally, the to-be-dumped data of the row store database may be located in an internal memory of a target device (for example, a network element node). A position of the row store database is not specifically limited in this embodiment.

Optionally, in this embodiment, target attribute values recorded in target columns of the target row may be stored to one or more target pages in a column-oriented database. Target attribute values recorded in the same target column of the target row are recorded in at least one of a plurality of target pages in the column-oriented database.

Optionally, the target column may be an attribute column in the data table of the row store database. A plurality of target columns in this application may be all attribute columns of the data table, or may be subsets of all attribute columns of the data table. The plurality of target columns may be specified by target parameters. Attribute types recorded in different target columns may be the same or different. Column widths assigned to target columns of different attribute types may be the same or different, and column widths assigned to target columns of the same attribute type may be the same or different. The attribute columns may be specifically set according to requirements. This is not specifically limited in this embodiment.

For example, for an account table Account (ID int, Name char (8), Balance int, Note text), a plurality of target columns may be all columns, or may be some columns (for example, ID, Balance, Note) in the account table.

Optionally, after the target row to be cleared is obtained, the target attribute values recorded in the target column are read from the obtained target row. Target attribute values corresponding to different target rows in the same target column may be the same or different.

Optionally, a persisted data part in the foregoing column-oriented database (column store database) may be located in an external memory (for example, a disk) of the target device, and other data parts may be located in the internal memory of the target device. A position of the column store database is not specifically limited in this embodiment. Generally, a column store database stores data of a super-large scale. An excellent data storage manner is a foundation for implementing efficient use of space and improving a query speed. The column store uses a paging and segmentation management structure, and may effectively utilize concepts such as a table space, to continuously store column store data in an external memory during dumping. In this way, calculation on columns in the column store can be performed conveniently.

Optionally, there may be a plurality of target rows, and when a plurality of target columns of the plurality of target rows are stored in the target pages in the column store database, target attribute values recorded in the same target column in the plurality of target columns of the plurality of target rows may be recorded in at least one of the target pages in the column store database.

Optionally, the target attribute value recorded in the at least one target row may be stored to the target page in the column store database in a plurality of manners.

In an optional implementation, the target attribute values recorded in different target columns of the plurality of target rows may be directly stored to one or more pages in the column-oriented database.

Optionally, the target attribute values recorded in the plurality of target columns of the plurality of target rows may be sequentially written to one of the target pages according to a sequence of columns in the data table, and written into another page after the page is full. The target attribute values recorded in different target columns of the plurality of target rows may alternatively be stored in different pages of the target pages.

Optionally, for target attribute values (first target attribute values) recorded in the target columns of the plurality of target rows, in a case that a first page of the target pages is filled with some target attribute values in the first target attribute values, other target attribute values in the first target attribute values, except the target attribute values that have been written to the first page, are stored to a second page of the target pages.

Optionally, when the target attribute values recorded in the plurality of target columns of the plurality of target rows are directly stored in one of the target pages in the column store database, the page may not be full, and this causes a waste of storage space.

Optionally, in a case that the column store database is located in the external memory, to fully utilize storage space (such as disk space) and ensure that each of the target pages in the column store database is full, pages that are not full may be loaded from the external memory into the internal memory, and new data may be saved to the pages that are not full.

In another optional implementation, target attribute values recorded in the target column of the plurality of target rows may be stored to a dump transition page. The dump transition page is used for dumping attribute values recorded in the target column to the target pages in the column-oriented database. The attribute values recorded in the dump transition page are stored in the target pages.

Optionally, when the column store database is located in the external memory, to avoid frequent read/write operations on the external memory, the dump transition page may be set in the internal memory, and the attribute values recorded in the target column is transited from the row store database to the column store database by using the dump transition page.

Figure 3:
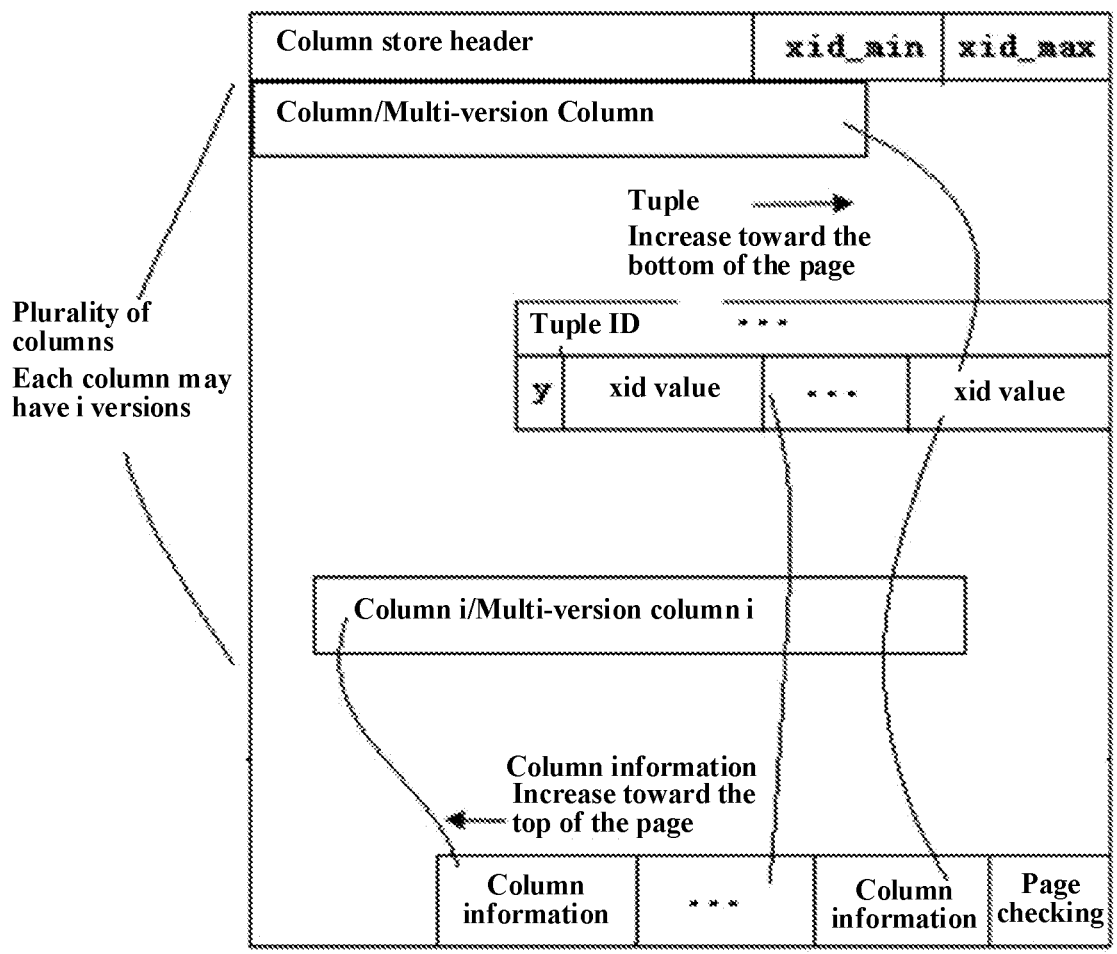
FIG. 3 is a schematic diagram of an optional dump transition page according to an embodiment of this application.
Figure 4:
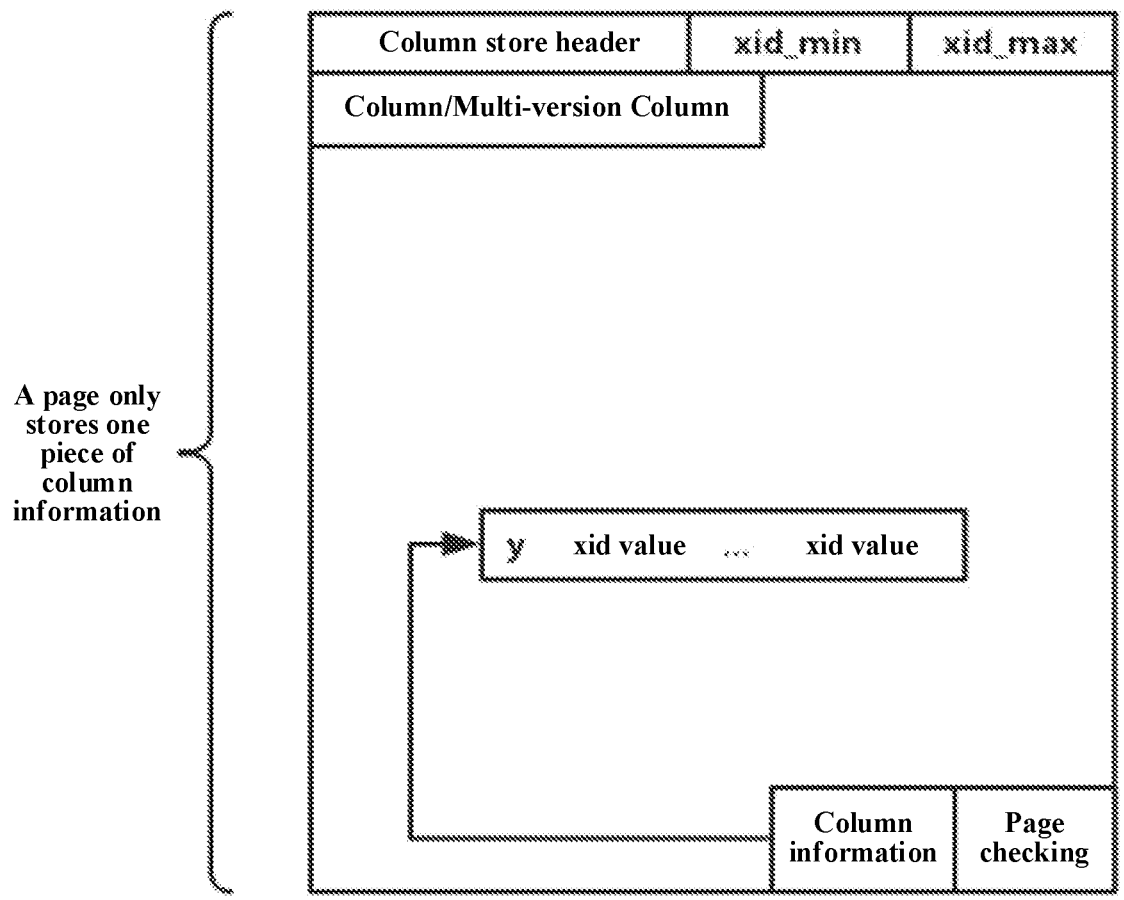
FIG. 4 is a schematic diagram of another optional dump transition page according to an embodiment of this application.

Optionally, a dump operation may be performed by using the dump transition page in a plurality of manners. Specifically, the dump operation may be performed in a manner of dumping the target attribute values recorded in the target column by using the same dump transition page (for example, the dump transition page is in a form of a page A as shown in FIG. 3), or the dump operation may be performed in a manner of dumping the target attribute values recorded in different target columns by using different dump transition pages (for example, the dump transition page is in a form of a page B as shown in FIG. 4, and the page B may be considered as a variation of the page A). Further, the dump transition page may be directly dumped to the target page, or a plurality of dump transition pages may be compressed in a pre-estimation compression manner, and the compressed dump transition pages are dumped to the target pages.

In an optional implementation, the target attribute values recorded in the target column of the plurality of target rows may be stored in the dump transition page by rows (in the same manner as storing data in a data table). Before, while, or after the target attribute values recorded in the target column of the plurality of target rows are stored in the dump transition page by rows, whether a predetermined condition is met may be determined, and in a case that the predetermined condition is met, the operation of dumping the attribute values to the target page is performed.

Optionally, whether the attribute values meet a first condition may be determined. If the attribute values meet the first condition, the attribute values that meet the first condition in the dump transition page are stored in one of the target pages in the column store database. The first condition may include, but is not limited to: a data amount of first K rows of attribute values recorded in the dump transition page is less than or equal to a target threshold, and a data amount of first (K+1) rows of attribute values is greater than the target threshold. The target threshold may be set according to a size of one of the target pages. After first L rows of attribute values recorded in the dump transition page are separately compressed by columns, it is estimated that a total amount of compressed data obtained through compression is less than or equal to the target threshold, and after first (L+1) rows of attribute values are separately compressed by columns, it is estimated that a total amount of compressed data obtained through compression is greater than the target threshold, where both K and L are positive integers greater than or equal to 1.

For example, the dump transition page records 100 rows of attribute values, and each row of data includes five attribute values. If a total data amount of the first 20 rows of attribute values is less than 2 KB (a target threshold, which is a size of an external memory page), and a total data amount of the first 21 rows of attribute values is greater than 2 KB, the first 20 rows of attribute values are stored in one page in the column store database. In another example, if an estimated total amount of compressed data is less than 2 KB after the first 80 rows of attribute values are separately compressed by columns (5 columns are separately estimated), and an estimated total amount of compressed data is greater than 2 KB after the first 81 rows of attribute values are separately compressed by columns, the attribute values of the first 80 rows are stored in one page in the column store database after being compressed by columns.

Optionally, whether a second condition is met may further be determined. If the second condition is met, the attribute values in the target column that meet the second condition in the dump transition page are separately stored in one of the target pages in the column store database. The second condition may include, but is not limited to: after first M rows of attribute values recorded in the dump transition page are separately compressed by columns, it is estimated that a maximum amount of compressed data in all amounts of compressed data obtained through compression is less than or equal to a target threshold, and after first (M+1) rows of attribute values are separately compressed by columns, it is estimated that a maximum amount of compressed data in all amounts of compressed data obtained through compression is greater than the target threshold, where M is a positive integer greater than or equal to 1.

For example, the dump transition page records 100 rows of attribute values, and each row of data includes 5 attribute values. If it is estimated that a maximum amount of compressed data in all amounts of compressed data obtained through compression is less than 2 KB after the first 90 rows of attribute values are separately compressed by columns, and it is estimated that a maximum amount of compressed data in all amounts of compressed data obtained through compression is greater than 2 KB after the first 91 rows of attribute values are separately compressed by columns, the attribute values of the first 90 rows are separately compressed by columns and are stored in the five pages in the column store database.

In another optional implementation, the target attribute values recorded in each target column of the plurality of target rows may be separately stored in a dump transition page corresponding to the target column. Each dump transition page records attribute values recorded in one target column, and each target column may correspond to one or more dump transition pages.

Optionally, dump transition pages corresponding to different target columns have the same size, but the amounts of data that can be recorded in the dump transition pages are related to attribute types corresponding to the target columns. The attribute types corresponding to the target columns may be digit, character, character string, and the like. In this case, generally, the same dump transition page can record more digits than character strings. A format and a size of the dump transition page are the same as a format and a size of the target page.

Optionally, the format of the dump transition page may include a page body section used for recording the attribute values of the target column. The page body section may specifically include at least one of the following: a page header and a page footer. The page header is used for representing an identification value range corresponding to target identifiers, and the target identifiers are identifiers corresponding to the attribute values recorded in the dump transition page. The page footer is used for checking the dump transition page.

The dump transition page is described below with reference to the following examples. The format of the dump transition page is the same as a format of a column store page. As shown in FIG. 3, the format of the dump transition page is a default design format of the column store page. A page including a plurality of columns of information is referred to as a page A. As shown in FIG. 4, the format of the dump transition page is an optional design format of the column store page. A page including only one column of information is referred to as a page B. There is no difference between the page B and the page A in structure, except that the page A includes a plurality of columns of information, and the page B includes only one column of information. The design of the page A is more consistent with a row store habit. Therefore, it is simpler to store to-be-dumped data, and dumping efficiency is better. However, a column query may require frequent page crossing, which affects query efficiency. In the design of the page B, to-be-dumped data needs to be split first, and dumping efficiency is relatively low. However, frequent page crossing can be avoided as far as possible during a column query, and the query efficiency is high. Before dumping, a user may first select a type of the dump transition page through parameter adjustment, and may use the format of the page A by default.

The format of a dump transition page may include three sections: a page header, a page body, a page footer.

(1) Page header (column store header): The page header is designed as an adaptive page header.

If a user does not define an index on the data table, it is set by default in the system that the page header includes: XID_min and XID_max (XID means a transaction ID, which is used for uniquely identifying a correspondence between attribute values in the same target row, that is, uniquely identifying a column version corresponding to each attribute value). XID_min represents a minimum XID of all column versions in this page, and XID_max represents a maximum XID of all the column versions in this page.

However, if the user defines an index on the data table, XID information on the page header may be replaced with corresponding index information, such as ID_Max and ID_Min.

Through the foregoing manner, a column store index may be constructed for the column storage page (the target page), to help quickly position column information.

(2) Page body: A page body includes column versions (attribute values) of one or more of the plurality of target columns. By default, each column version is represented by a two-tuple {XID, value}, to indicate a transaction that operates the value. If the user defines the header information, two-tuple information is replaced accordingly, for example, replaced with {ID, value}.

As shown in FIG. 3, a page body of the page A includes a plurality of columns, and each column includes a plurality of column versions. The columns are stored sequentially from the page header to the page footer. Each column, including a column ID, represents a specific column. Then, there are a plurality of tuple columns, representing unique tuples. Each tuple column includes a tupleID, representing a unique tuple column, and y indicates the quantity of versions of the tuple column. A combination of tupleID, y, and column versions may represent a historical change process of attribute values of a column in a tuple in a data table.

As shown in FIG. 4, for the page B, a page body of the page B includes a plurality of column versions of a column, and the column versions are stored sequentially from the page header to the page footer. For the column, there may be a plurality of tuple columns, representing unique tuples. Each tuple column includes a tupleID, representing a unique tuple column, and y indicates that the quantity of versions of the tuple column. A combination of tupleID, y, and column versions may represent a historical change process of attribute values of a column in a tuple in a data table.

(3) The page footer, located at the bottom of the page, includes: page verification information and column information.

For the page footer of the page A, the column information is column information of a plurality of columns. As shown in FIG. 4, for the page footer of the page B, the column information is column information of one column. The column information includes an ID of the column and an offset of the column in the page. The column information is stored sequentially from the page footer to the page header, forming a process of storing information from both ends to the middle (the column versions of the page body are stored sequentially from the page header to the page footer, and the column information is stored sequentially from the page footer to the page header), until the remaining space in the middle cannot longer accommodate a next column and next column information.

Optionally, one dump transition page may be created for each column in a memory data table, one dump transition page corresponds to one target column in the data table, and different attribute values in one target column may be located in different dump transition pages. When a dump occurs (data is dumped from a row store database to a column store database), data is written into the dump transition page first. If the dump transition page is not full, data is still written into the dump transition page when a next dump occurs. A collection of dump transition pages belonging to the same table may be referred to as a dump transition region.

Figure 5:
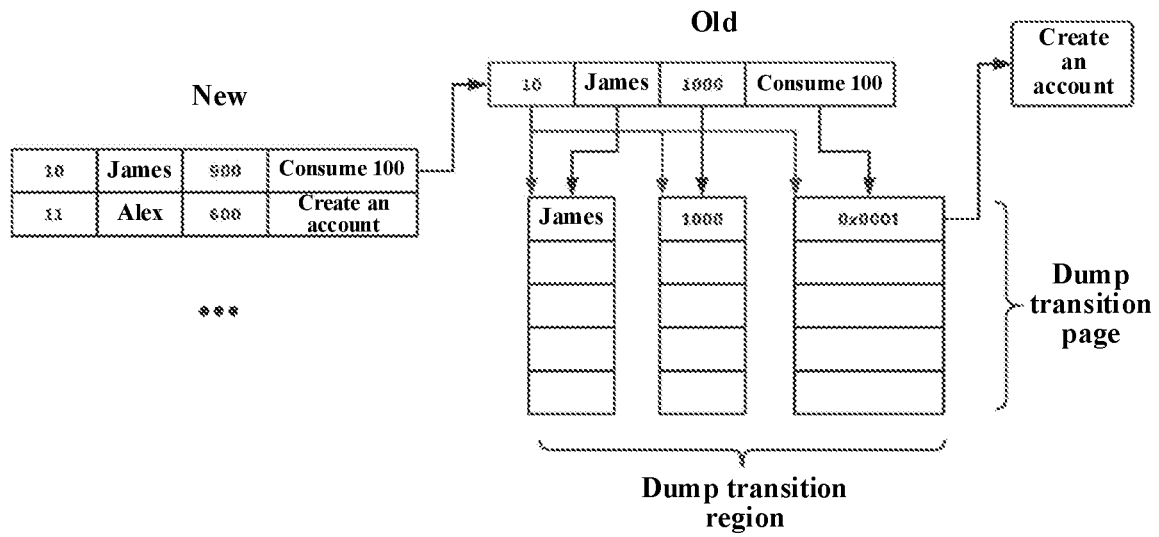
FIG. 5 is a schematic diagram of another optional data processing method according to an embodiment of this application.

The dump transition region is described below with reference to specific examples. As shown in FIG. 5, for historical data (10, James, 1000, Create account), "James", "1000", "Create account" and ID "10" are separately written to different dump transition pages, and a collection formed by a plurality of dump transition pages corresponding to the same data table is a dump transition region.

Optionally, before, while, or after the target attribute values recorded in the target columns of the plurality of target rows are separately stored into the dump transition pages corresponding to the target columns, whether the target condition is met may be determined, and in a case that the target condition is met, the operation of dumping the attribute values to the target pages is performed.

Optionally, in a case that the dump transition page is filled with all or some of the target attribute values recorded in the same target column of the plurality of target rows (the target condition), attribute values recorded in the dump transition page that have been full are stored to a third page in the target pages, where the attribute values recorded in the dump transition page include the target attribute values that are in the same target column of the plurality of target rows and that have been written to the dump transition page.

Optionally, because the dump transition page and the page in the column store database may have the same format, the attribute values on the dump transition page that has been full may be directly written into one page in the column store database to the full.

Optionally, the storing attribute values recorded in the dump transition page to a third page in the target pages includes: determining header information of the dump transition page, the header information being used for identifying an identification value range of target identifiers corresponding to the attribute values recorded in the dump transition page; and storing the header information and the attribute values recorded in the dump transition page to the third page in the target pages. A range of the target identifiers corresponding to the attribute values in the target columns stored in the third page can be quickly determined by using the header information, to help quick positioning during a subsequent query.

Optionally, the target identifier may have a plurality of forms, which may include, but are not limited to: a version identifier and a constraint column. The version identifiers are used for uniquely identifying column versions of the plurality of target columns, and the constraint column is a predetermined column in the plurality of target columns.

In an optional implementation, when the target identifier is the version identifier, as shown in FIG. 3 or FIG. 4, the header information may include: a maximum value and a minimum value of the version identifiers corresponding to the attribute values recorded in the dump transition page. The version identifiers are used for uniquely identifying the column versions of the target columns of the plurality of target rows. The version identifier may include, but is not limited to: a transaction ID, and a user-defined index identifier. Because the XID is unique, the dump transition page in the internal memory and a plurality of column store pages located in the internal memory may be managed by using HASH.

Optionally, for temporal-related data, the dump transition page does not need to be specially limited, provided that the historical-state data is ensured to be sequentially written to the dump transition page. A bank service is used as an example. A case of querying all transaction records of a specific bank branch in a specific year is temporal-related. For ease of querying, similar records are required to be continuously stored in chronological order.

In another optional implementation, when the target identifier is an attribute (for example, "location" or "temperature") of the constraint column, the target identifier in the header information of the dump transition page is constraint column information. The header information may include: one or more key-value pairs, each key-value pair including an attribute value of the constraint column (a first target column of the plurality of target rows) and a page offset corresponding to the attribute value of the constraint column. The attribute value of the constraint column corresponds to a column version of an attribute value of a target column (a second target column of the plurality of target rows) stored in the dump transition page. The attribute value of the constraint column and the attribute value of the corresponding target column are continuously stored in the dump transition page. The page offset is an offset of a storage position of the attribute value of the target column in the dump transition page. The dump transition page is a dump transition page corresponding to the attribute value of the constraint column. The offset is also an offset of the storage position of the attribute value of the target column relative to a storage position of the attribute value of the constraint column.

The foregoing dump transition page may be applicable to data in a distribution with a high degree of aggregation. In short, the constraint column information (for example, IDs) is distributed in batches. Provided that one ID is found, IDs consistent with the found ID are continuously distributed thereafter. One page may include only a few IDs.

Using meteorological monitoring data as an example, a meteorological station updates temperature information every 5 minutes, and collects the temperature information to a meteorological center. Temperature changes monitored by the meteorological station in one day need to be queried. This case is related to data distribution areas, and it is improper to store data in chronological order; instead, storage needs to be consistent with data distribution.

Optionally, different constraint elements (attribute values of the constraint column) in a page may be referred to as an Item. In this case, the page header includes only such a key-value pair as <Item, page offset>. A data structure formed by data names (the constraint elements) and page offset addresses is referred to as an Item Map. The Item Map is written in the page header of the external memory.

Optionally, "interval writing" may be performed when the dump data is written to the dump transition page. The interval writing means that after a piece of historical-state data is written into the dump transition page, a plurality of blank rows are reserved for subsequent insertion of historical-state data (historical-state data corresponding to the same constraint value) of the same constraint (for example, a primary key), and records of different constraints are inserted after the plurality of blank rows. A value of a row space is determined by a size of a space occupied by the first value of each interval. The interval is set as a parameter value k, that is, a k-row interval is tolerated, and the value of k is set according to a modification frequency of an application. A default value is 10.

Figure 6:
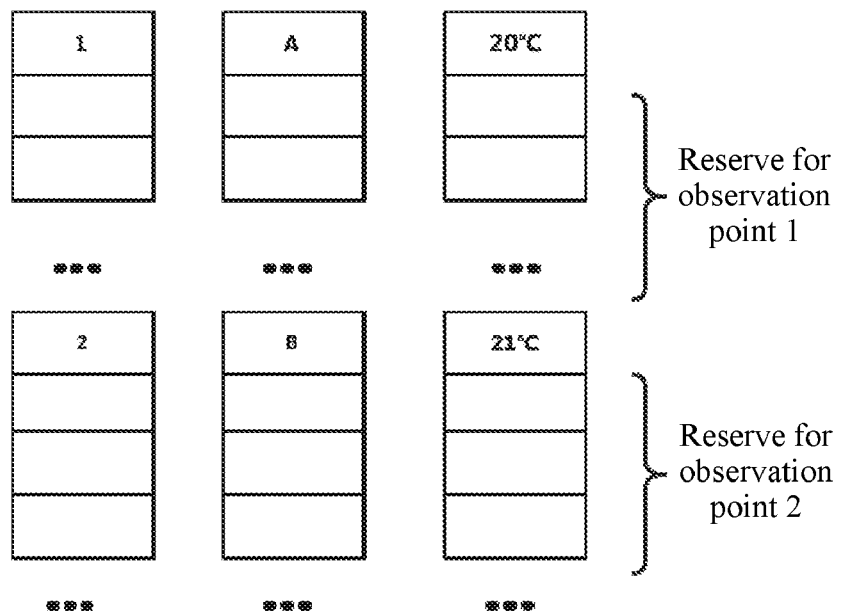
FIG. 6 is a schematic diagram of still another optional data processing method according to an embodiment of this application.

For example, a meteorological bureau of a city has N meteorological observation stations. An air temperature table Temp (ID int, Location char (8), Temperature int) is used for recording real-time air temperatures, and recorded attributes include: an observation station identifier, a location, and a temperature. In this table, both ID and Location may be used as constraint columns. In this way, a write order of dump transition pages is shown in FIG. 6 (showing dump transition pages corresponding to "ID", "Location", and "Temperature"). After data of an observation station with an ID being 1 is written, data of an observation station with an ID being 2 is then written after an n-row interval, where a value of n is set by using a parameter. In this way, data belonging to the same constraint element is aggregated. The data may be read sequentially during a query, thereby improving the query efficiency.

Optionally, during an operation of page copy from the dump transition page to a common column store page (a target page in the column store database), the attribute values recorded in the dump transition page may be directly copied to the common column store page. Alternatively, the attribute values recorded in one or more dump transition pages corresponding to the same column are compressed in units of pages, and then copied to the common column store pages, to save the storage space.

Optionally, when information of a plurality of target columns is stored in the same dump transition page (for example, the page A), a compression rate of each target column in the dump transition page may be estimated first, and after estimated amounts of compressed data of all the target columns are summed, whether a dump may be performed is determined according to the total amount of compressed data. When information of one target column is stored in one dump transition page (for example, the page B), compression rates of the dump transition pages corresponding to the target columns may be separately estimated, and dumps are separately performed according to the compression rates. A column store page (the format of the dump transition page) may be selected before the dump starts.

Optionally, an estimated total amount of compressed data after data of each dump transition page is compressed in a target compression manner may be determined. The dump transition pages store attribute values corresponding to the target columns. In a case that the total amount of compressed data meets a target condition, the plurality of dump transition pages are compressed by using the target compression manner, to obtain total compressed data. The target condition is that: the total amount of compressed data is less than or equal to a target threshold, and the total amount of compressed data plus an amount of compressed data of one dump transition page is greater than the target threshold. The total compressed data is stored into the third page in the target pages.

Optionally, the state of the dump transition page may be monitored based on a compression estimation technology. For example, if a calculated estimate after compression cannot fill an external memory page to the full, the dump transition page is extended to be an Extend page accordingly. A plurality of dump transition pages corresponding to the same target column in the internal memory may be extended to be an Extend page (for example, an Extend page has a size of 8 dump transition pages). That is, if there are n such dump transition pages in successive corresponding to the same column, one Extend page is full. Then, the Extend page is compressed and persisted (that is, the compressed data is written to the page in the external memory), and is stored as a common column store page. Before the Extend page is compressed and stored, header information included in the Extend page is recorded. In this way, compression efficiency can be improved, and storage space can be saved.

Optionally, because a value of the data compression rate is directly related to the data distribution in the dump transition page, it is impractical to determine, by using a uniform standard, when to compress the data in the dump transition page and persist the data to the external memory. Therefore, a compression estimation needs to be performed first, to ensure that the external memory page can be filled as full as possible, and reduce cross-page reading during a query.

Optionally, an accurate estimation may be performed according to the data distribution in the dump transition page by using an information entropy theory. For example, if a specific Extend page that stores Name data only includes two types of data: James and Alex, a Name column of an Account table requires only one binary bit, where 1 represents James, and 0 represents Alex. If a dump transition page that stores the Name data includes three types of data:

James, Alex, and Bob, two binary bits are required. By analogy, in a case of uniform distribution, assuming that a probability of a character (or a character string) occurring in the dump transition page is p, $\log_2(1/p)$ binary digits are required, to represent a substitution symbol for replacing the character (or the character string).

Generally, it is assumed that the dump transition page is formed by n types of data, probabilities of occurrence of each type of data are p1, p2 . . . pn respectively, and minimum binary digits occupied by substitution symbols are:

$$\sum_{k=1}^{n} \log_2\left(\frac{1}{p_k}\right).$$

p is obtained according to frequency statistic. Therefore, a mathematical expectation of binary digits occupied by each type of data in the dump transition page is shown in equation (1) (according to equation (1), a data compression rate may be estimated):

$$E = \sum_{k=1}^{n} p_k * \log_2\left(\frac{1}{p_k}\right) \quad (1)$$

The Name column of the Account table is used as an example for description. It is assumed that there are three types of data: James, Alex, and Bob in a dump transition page, the total quantity of data items is 1024, a size is 4 KB, and proportions of the three types of data are 50%, 30%, and 20%. In this case, binary digits occupied by each type of data is $0.5*\log_2(1/0.5)+0.3*\log_2(1/0.3)+0.2*\log_2(1/0.2)=1.49$. Theoretically, if each type of data occupies 1.49 binary digits, compressing 1024 data items theoretically requires 1526 binary digits, that is, 0.19 KB. A compression rate is approximately 20:1. In this case, one full external memory page approximately requires compression of 20 dump transition pages in the internal memory.

Optionally, an information table may be maintained for a to-be-dumped data table in the internal memory, to monitor the data distribution of each dump transition page in real time, and estimate the compression rate of each dump transition page, to extend the dump transition page to be an Extend page. The Extend page may be an actual page (the header information, the page body information, and the page footer information of each dump transition page are separately written to corresponding positions of the Extend page), or a virtual page (dump transition pages corresponding to the same Extend page are identified according to the information table). When a theoretical amount of compressed data in a specific Extend page may fully occupy an external memory page, the Extend page is compressed and persisted. Then, the internal memory space occupied by the extended page is also released. An Extend page that cannot fully occupy the external memory page (that is, one page in the column store database) continues to reside in the internal memory, to wait for a next dump.

Optionally, for possible inaccurate estimations, a Map structure may be further maintained, to establish a relationship between a table (column) that is being dumped currently and a corresponding page. After the dump is recorded, a remaining space in a corresponding dump transition page, for example, information <t, 2k> in a Map, indicates that after the dump is performed, the page (dump transition page) corresponding to a table t has 2k unused space. In this way, a dump thread first searches the Map before the compression estimation is performed. The search may have two results. If there is no information about the table (column) in the Map, it indicates that the table (column) is dumped for the first time, or there is no remaining space on the page after the previous dump. A default page size may be directly estimated for the current dump, and information about a remaining space after the dump is written to the Map. If there is information about the table (column) information in the Map, it indicates that there is a remaining space on the page after the table (column) is dumped previously, and compression estimation may be performed according to a read idle value of the page. A full page herein is not absolutely full; instead, a threshold (for example, 99%) is set, and when a ratio of an occupied space on a current page to a total space of the page is greater than or equal to the threshold (for example, the occupied space is greater than or equal to 99% of the total page), the page is considered as full, and the table information is deleted from the Map.

Optionally, in a scenario in which information of one target column is stored in a dump transition page (for example, the page B), corresponding Map information is a correspondence between the column and an idle space of a corresponding page, for example, <column1, 2k>. Related operations are similar to the foregoing operations, and are not described herein.

In an optional implementation, for each of the plurality of target columns, a target column that has a maximum total amount of compressed data obtained after compression in the target columns may be used as a standard. When the maximum total amount of compressed data meets the target condition, dump transition pages (Extend pages) corresponding to the target columns are separately compressed, and are each stored in one of the target pages.

Figure 7:
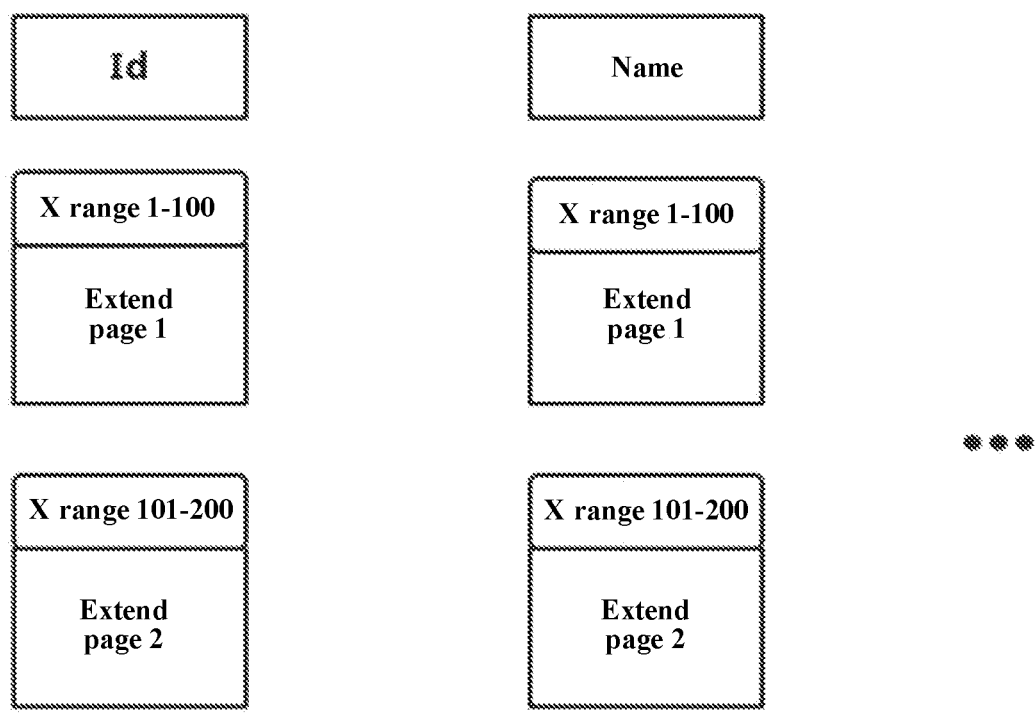
FIG. 7 is a schematic diagram of still another optional data exchange method according to an embodiment of this application.

For example, as shown in FIG. 7, before the Extend page is compressed, an XID range of the Extend page needs to be determined according to XID_min/XID_max (version identifier, or user-defined information such as ID_min/ID_max) provided in the page header. The XID range is stored in the header information in the compressed external memory, and is referred to as an X Range. The X Range may reduce unnecessary decompression operations during a query. The Extend page shown in FIG. 7 is an Extend page after being compressed and persisted, that is, an external memory compressed page.

For a temporal-related query, the internal memory transition page does not need to be specially limited, provided that the historical-state data is ensured to be sequentially written to the dump transition page in the internal memory. Because the XID is unique, the dump transition page in the internal memory and a plurality of column store pages located in the internal memory may be managed by using HASH.

Figure 8:
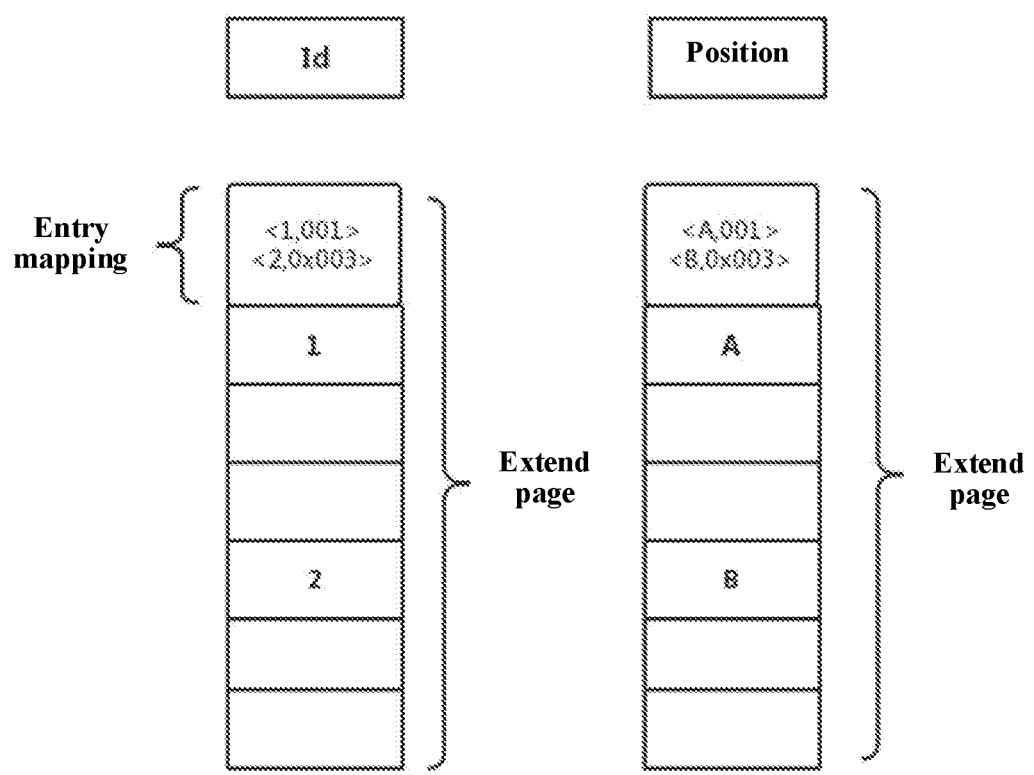
FIG. 8 is a schematic diagram of still another optional data processing method according to an embodiment of this application.

In another example, as shown in FIG. 8, before an Extend page is compressed, a key-value pair of each Extend page needs to be determined according to the key-value pair <attribute value of constraint column, page offset address> provided by the page header, and the key-value pair of each Extend page is stored in the header information of the compressed external memory page. The data structure formed by data names and page offset addresses is referred to as an Item Map.

Optionally, the address information in the header of the external memory page and the key value of the Item Map are loaded into the internal memory when a column store system is started, to establish a column store index, thus accelerating the query process.

In another optional implementation, for each target column of the plurality of target rows, operations of extending to be an Extend page, estimating an amount of compressed data, compression and persistence may be performed separately, and the dump transition pages corresponding to the target columns do not affect each other. A corresponding data storage manner of the pages in the column store database is similar to that in FIG. 7 and FIG. 8, except that a range of the column index of the page header in each page or the page offset in the key-value pair may be different.

Optionally, in this embodiment, after the target time arrives, the target row may be cleared. After the target row is cleared, query information used for performing a data query on the data table may be further received. The data in the data table may be stored in the data table of the row store database and the target page in the column store database, and may be also stored in a data page (for example, PostgreSQL) or a rollback segment (MySQL).

Optionally, after the query information is received, the target pages in the column store database and the data table in the row store database (or, the data page or the rollback segment) may be sequentially queried according to the query information, to obtain a query result corresponding to the query information and output the obtained query result. Both the row store database and the column store database may be located in the internal memory, or the row store database is located in the internal memory, and the column store database is located in the external memory.

When a data dump is performed by using the dump transition page, the data in the data table may be stored in the data table of the row store database, the dump transition page, and the target pages in the column store database. The data may be alternatively stored in the data page (for example, PostgreSQL) or the rollback segment (MySQL).

Optionally, after the query information is received, the target pages in the column store database, the data table in the row store database, and the dump transition page (or the data page or the rollback segment) may be sequentially queried according to the query information, to obtain a query result corresponding to the query information, and output the obtained query result. The column store database and the dump transition page may be located in the internal memory, and the column store database may be located in the external memory.

Optionally, after the query information is received, if the received query information includes a target identifier query value (a specific value, or a range value), the row store index, the column store index, and the dump transition page of the data table are obtained. The row store index is an index of row store data stored in the data table in the row store database, the column store index is an index of identification values of target identifiers stored in the target pages, and the target identifier corresponds to the attribute value of the target column. The column store index, the row store index, and the dump transition page are sequentially queried by using the query value, to determine a target position of the target data corresponding to the query information. A query result corresponding to the query information is obtained from the determined target position. The obtained query result is outputted.

Optionally, the obtaining a row store index, a column store index, and the dump transition page of the data table may include the following steps: obtaining a storage address of the data table, for example, obtaining a storage address of data from metadata of the data table in a data dictionary; loading the data table (the data table in the row store index) into a data cache area, and obtaining a row store index of the data table; and obtaining the dump transition page and the column store index (the dump transition page and the column store index may reside in the internal memory). The column store index may include, but is not limited to: an index and key-value pairs of version identifiers.

Optionally, the search may be performed on the column store index and the row store index by using the query value. If the query value is found in the column store index, a corresponding column store page is found according to the column store index, and data is read from the page. If the query value is found in the row store index, a page in the row store format is traversed according to a position to which the row store index points, to read data. The dump transition page is traversed, and if existing, the data is read.

Optionally, a corresponding compressed page may be queried according to an indication of the X range. A decompression operation is performed on the corresponding compressed page, to read data. Alternatively, a corresponding compressed page may be queried according to the indication of the Item Map. A decompression operation is performed on the corresponding compressed page, to read data.

Optionally, the column store index may be first searched, the row store index is then searched, and an SQL statement may give a Hint instruction, to determine which index is first searched. For a query related to a version identifier, the column store index (for example, the X Range), the row store index, and the dump transition page may be queried sequentially, until a corresponding query result is found. For queries related to the attribute value of the constraint column, the column store index (for example, the Item Map), the row store index, and the dump transition page may be queried sequentially, until all corresponding query results are found.

For example, as shown in FIG. 7, an SQL query statement SELECT Name FROM Account WHERE XID<20 AND XID>10 is executed, and in a process of querying column store, each Extend page of Name is decompressed first according to a general query process, to find an XID that meets the condition, and then a Name value is obtained. Decompression needs to consume a large quantity of resources, and affects the query speed. If the SQL query statement is executed based on the X Range, it can be learned in advance that the Name value that meets the condition exists only Extend 1. Therefore, only the Extend 1 needs to be decompressed. In addition, it is unnecessary to query the row store index and the dump the transition page, thereby greatly reducing a decompression and query time.

The data query based on the constraint column well supports regularly generated data such as meteorological information and updated information periodically collected by an Internet of Things node, but cannot support irregularly updated data desirably.

For example, when the SQL statement SELECT Temperature FROM Temp WHERE ID=1 is executed, a Temperature value with ID=1 may span several compressed pages according to the query based on the X range, and a large amount of decompression is performed during the query. However, in a query based on the Item Map, only key values of the Item Map in the header information need to be queried, to obtain a page offset value with ID=1; a data range with ID=1 is calculated, and then, data within a range corresponding to the Temperature column is found according to the page offset value.

For ease of management, all pages in the external memory that belong to the same column form a Segment. The Segment is only a logical division, and a physical implementation thereof is not within the scope of this application. A dump policy to be adopted is determined by a user by setting storage parameters according to a specific query analysis scenario before the dump starts. A default dump policy is based on version identifiers.

Figure 9:
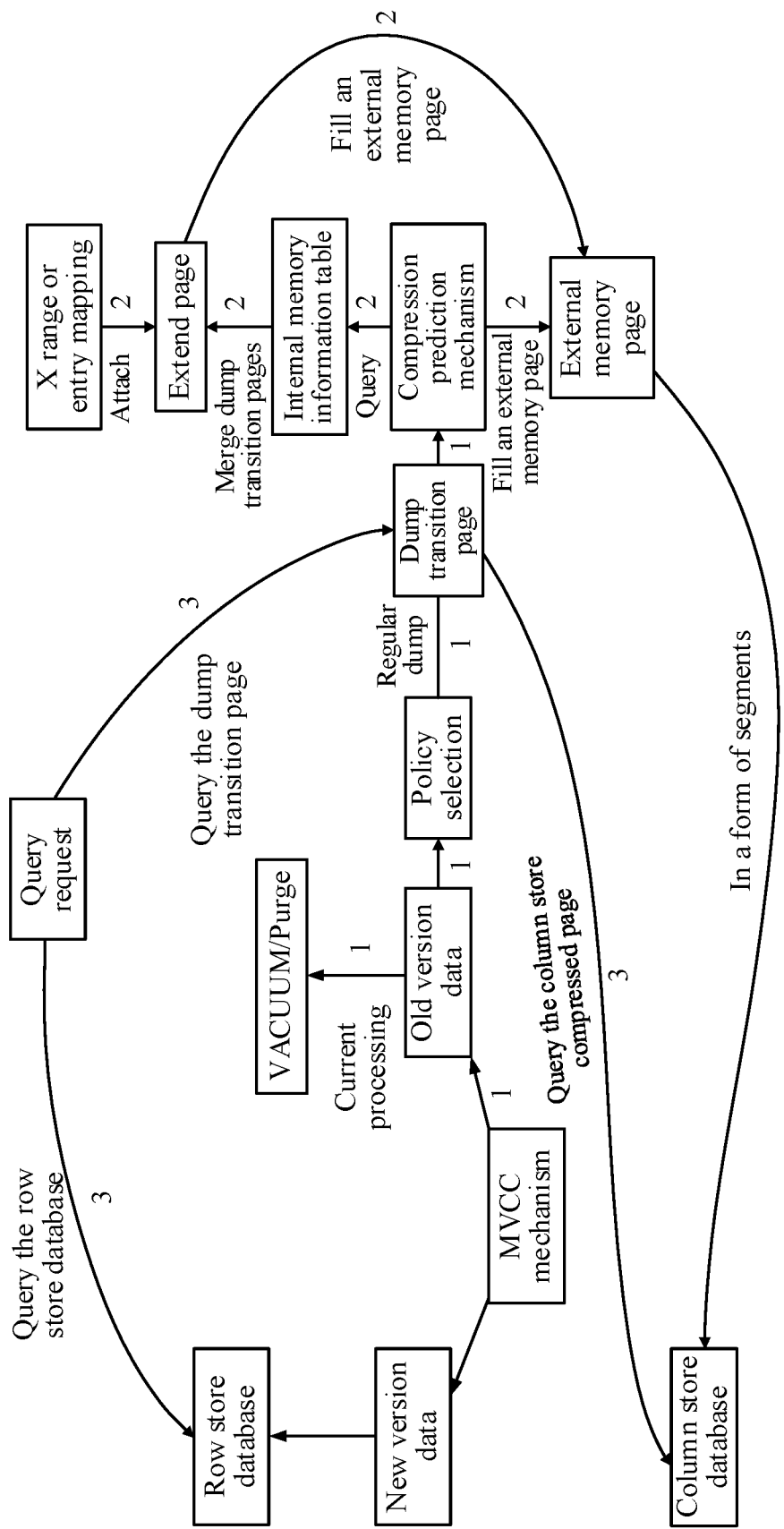
FIG. 9 is a schematic flowchart of another optional data processing method according to an embodiment of this application.

The data processing method is described below in combination with the following example. A complete data processing method is shown in FIG. 9, and is mainly divided into three steps:

Step 1 (indicated by an arrow labeled as 1): Write data to a dump transition page periodically based on a policy selected by a user.

Step 2 (indicated by an arrow labeled as 2): Persist the dump transition page or an Extend page to an external memory by using a compression prediction mechanism, and establish an X Range or an Item Map index.

Step 3 (indicated by an arrow labeled as 3): When a query request arrives, perform a query on row store or the dump transition page and column store according to an SQL Hint, the query being performed on the dump transition page and the column store by default.

In this example, an XID (or another index) range of each tuple in the column store is used for managing the dump transition page, so that an addressing speed can be effectively improved. In addition, for different data scenarios, by using the X range and Item Map mode based on the compression prediction mechanism, it is ensured that irrelevant compressed pages are not decompressed during the query in the column store, thereby improving the query performance. In addition, an upper application system may read newest data in the row store database, and an analysis system may perform data analysis based on the column store, to obtain valuable information. The application system and the analysis system do not affect each other, fully utilizing value of the data.

According to this embodiment, at least one target row to be cleared at a target time is obtained from a data table of a row-oriented database. Target attribute values recorded in target columns of the at least one target row are stored to target pages in a column-oriented database. Target attribute values recorded in the same column of the target row are recorded in at least one of the target pages in the column-oriented database. After the target time arrives, the target row is cleared, to save the historical data in the database, and ensure the integrity of the data change history.

In an optional implementation, the storing target attribute values recorded in the target columns of the at least one target row to target pages in a column-oriented database includes the following steps:

S1. Store target attribute values recorded in different target columns of a plurality of target rows to different pages in the target pages, where in a case that a first page in the target pages is filled with some target attribute values recorded in the same target column of the plurality of target rows, other target attribute values in the target attribute values recorded in the same target column of the plurality of target rows, except the target attribute values that have been stored in the first page, are stored into a second page in the target pages.

According to this embodiment, the target attribute values recorded in different target columns are stored in different pages in the target pages, and the attribute values recorded in the same target column may be stored in different pages, so that a storage mode of the attribute values of the target columns can be properly planned, to facilitate management of the target pages.

In an optional implementation, the storing target attribute values recorded in the plurality of target columns of the at least one target row to target pages in a column-oriented database includes the following steps:

S1. Store target attribute values recorded in the same target column of a plurality of target rows to a dump transition page, the dump transition page being used for dumping attribute values recorded in the target columns to the target pages in the column-oriented database.

S2. Store, in a case that the dump transition page is filled with all or some of the target attribute values recorded in the same target column of the plurality of target rows, attribute values recorded in the dump transition page to a third page in the target pages, the attribute values recorded in the dump transition page including the target attribute values recorded in the same target column.

According to this embodiment, the target attribute values in the target column that are recorded in the dump transition page are dumped only when the dump transition page is full, so that the page in the target pages is full, to avoid a waste of a storage space.

In an optional implementation, the storing target attribute values recorded in the same target column of the at least one target row to the dump transition page includes the following steps:

S1. Determine header information of the dump transition page, the header information being used for identifying an identification value range of target identifiers corresponding to the attribute values recorded in the dump transition page.

S2. Store the header information and the attribute values recorded in the dump transition page to a third page in the target pages.

Optionally, the header information includes: a maximum value and a minimum value of version identifiers corresponding to the attribute values recorded in the dump transition page, the target identifier being the version identifier, and the version identifiers being used for uniquely identifying column versions of the plurality of target columns of the plurality of target rows. Alternatively, the header information includes: one or more key-value pairs, each key-value pair including an attribute value of a first column in the plurality of target columns of the plurality of target rows and a page offset corresponding to the attribute value of the first column, the attribute value of the first column corresponding to a column version of an attribute value of a second column stored in the dump transition page, the attribute value of the first column and the attribute value of the second column being continuously stored in the dump transition page, and the page offset being an offset of a storage position of the attribute value of the second column in the dump transition page.

According to this embodiment, the header information is set, so as to form an index of the attribute values stored in the page in the column-oriented database, to facilitate management of the target page.

In an optional implementation, the storing attribute values recorded in the dump transition page to a third page in the target pages includes the following steps:

S1. Determine an estimated total amount of compressed data after data of each dump transition page in a plurality of dump transition pages is compressed in a target compression manner, each dump transition page in the plurality of dump transition pages storing attribute values corresponding to the same target column of the plurality of target rows, and the plurality of dump transition pages including the dump transition page in which the recorded attribute values are to be stored to the third page in the target pages.

S2. Separately compress each dump transition page in the plurality of dump transition pages in the target compression manner to obtain total compressed data in a case that the total amount of compressed data meets a target condition, the target condition being that the total amount of compressed data is less than or equal to a target threshold, and the total amount of compressed data plus an amount of compressed data of one dump transition page is greater than the target threshold.

S3. Store the total compressed data to the third page in the target pages.

According to this embodiment, by estimating the total amount of compressed data after the attribute values in the plurality of dump transition pages corresponding to the same column of the plurality of target rows are compressed, when the total amount of compressed data is greater than the target threshold, the attribute values in the plurality of dump transition pages are stored in one of the target pages after being compressed, thereby saving storage space.

In an optional implementation, after the clearing the at least one target row, the method further includes the following steps:

S1. Receive query information used for performing a data query on the data table.

S2. Sequentially query the target pages in the column-oriented database and the data table in the row-oriented database by using the query information, to obtain a query result corresponding to the query information.

S3. Output the query result.

According to this embodiment, the data table in the row-oriented database and the target pages in the column-oriented database are separately queried by using the query information, so that the comprehensiveness of the query result is ensured.

In an optional implementation, after the clearing the at least one target row, the method further includes the following steps:

S1. Receive query information used for performing a data query on the data table.

S2. Sequentially query the target pages in the column-oriented database, the data table in the row-oriented database, and the dump transition page by using the query information, to obtain a query result corresponding to the query information.

S3. Output the query result.

According to this embodiment, the data table in the row-oriented database, the target pages in the column-oriented database, and the dump transition page are separately queried by using the query information, so that the comprehensiveness of the query result is ensured.

In an optional implementation, after the clearing the at least one target row, the method further includes the following steps:

S1. Receive query information used for performing a data query on the data table, the query information including a query value corresponding to the target identifier.

S2. Obtain a row store index, a column store index, and the dump transition page, the row store index being an index of row store data stored in the data table in the row-oriented database, and the column store index being an index of identification values of target identifiers corresponding to attribute values of the plurality of target columns stored in each of the target pages.

S3. Sequentially query the column store index, the row store index, and the dump transition page by using the query value, and determine a target position in which a query result corresponding to the query information is stored.

S4. Obtain, by using the target position, the query result corresponding to the query information.

S5. Output the query result.

According to this embodiment, the column store index, the row store index, and the dump transition page are separately queried according to the query information including the query value corresponding to the target identifier, so that the query efficiency and the comprehensiveness of the query result are ensured.

Figure 10:
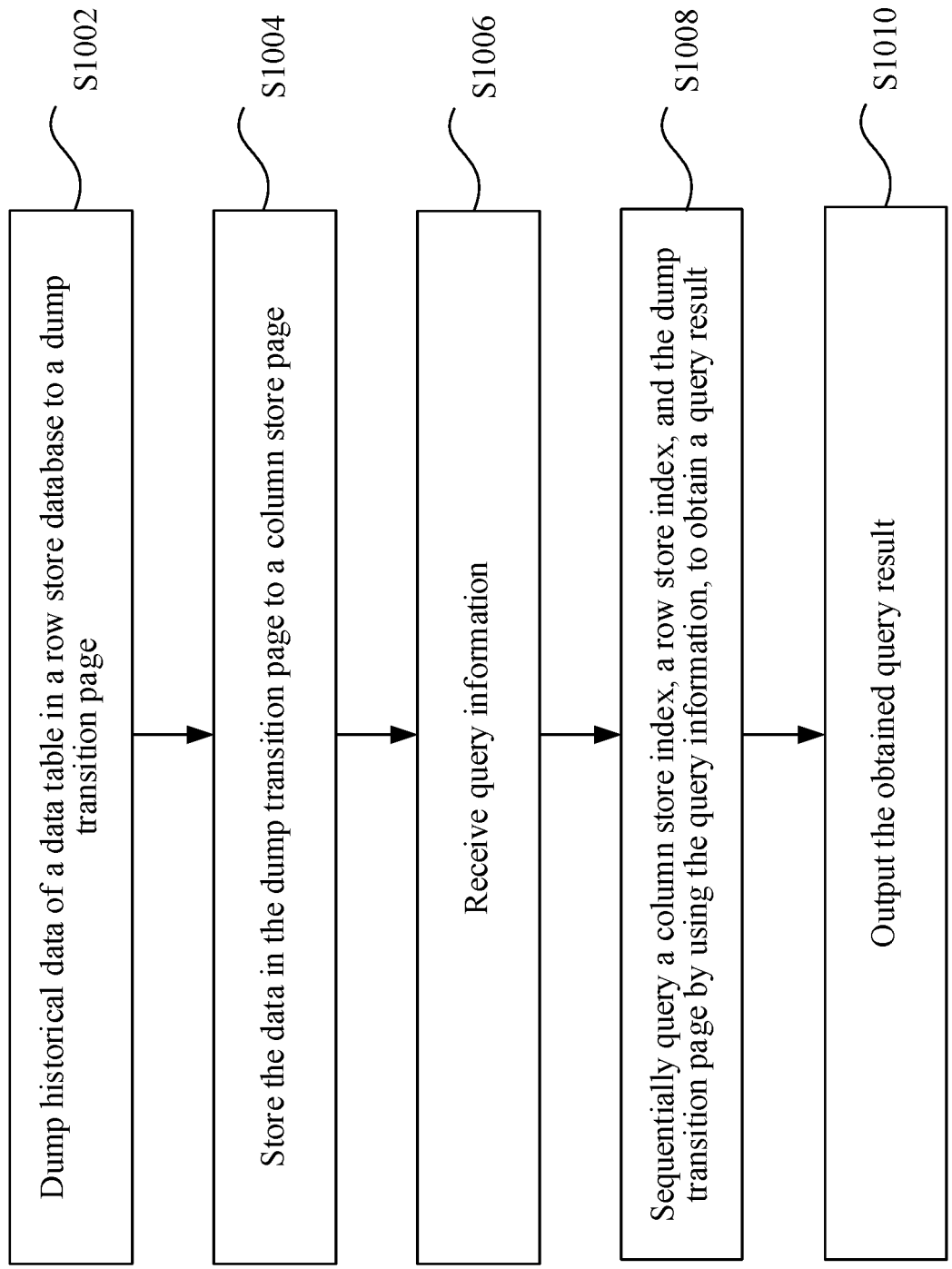
FIG. 10 is a schematic flowchart of still another optional data processing method according to an embodiment of this application.

With reference to FIG. 10, the foregoing data processing method is described below. As shown in FIG. 10, a processor of a network element node dumps historical data of a data table in a row store database to a dump transition page through step S1002. Through step S1004, the processor stores data in the dump transition page to a column store page. Through step S1006, the processor receives query information. Through step S1008, the processor sequentially queries a column store index, a row store index, and the dump transition page by using the query information, to obtain a query result. Through step S1010, the processor outputs the obtained query result.

For ease of description, the foregoing method embodiments are stated as a series of action combinations. However, a person skilled in the art needs to know that this application is not limited on the sequence of the described actions because according to this application, some steps may use another sequence or may be simultaneously performed. In addition, a person skilled in the art needs to know that, the embodiments described in the specification are all exemplary embodiments and the related actions and modules are not mandatory to this application.

According to the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of this application essentially, or a part contributing to the related art may be implemented in a form of a software product. The computer software product is stored in a storage medium (for example, a read-only memory (ROM)/random access memory (RAM), a magnetic disk, or an optical disc), and includes several instructions for instructing a terminal device (which may be a mobile phone, a computer, a server, a network device, or the like) to perform the methods according to the embodiments of this application.

Figure 11:
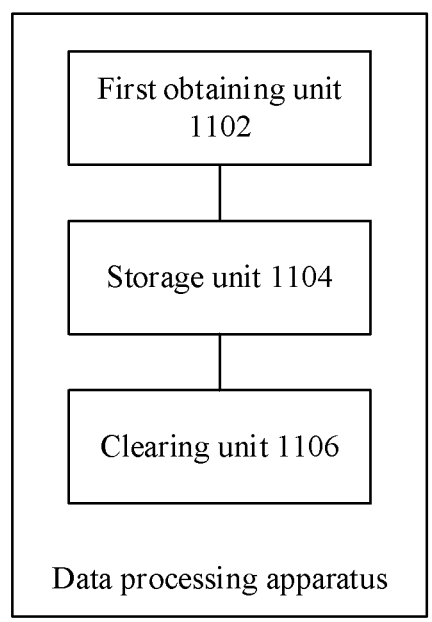
FIG. 11 is a schematic structural diagram of an optional data processing apparatus according to an embodiment of this application.

According to another aspect of the embodiments of this application, a data processing apparatus configured to implement the data processing method is further provided. As shown in FIG. 11, the apparatus includes:

(1) a first obtaining unit 1102, configured to obtain at least one target row to be cleared at a target time from a data table of a row-oriented database;

(2) a storage unit 1104, configured to store target attribute values recorded in the at least one target row to target pages in a column-oriented database; and (3) a clearing unit 1106, configured to clear the at least one target row after the target time arrives.

In the related art, historical data in a database is cleared by using a clear operation. The method in the related art causes missing of the historical data in the database, making it difficult to trace the historical data. In this application, the at least one target row to be cleared at the target time is obtained from the data table of the row-oriented database. The target attribute values recorded in the at least one target row are stored to the target pages in the column-oriented database. The at least one target row is cleared after the target time arrives, to save the historical data in the database, ensure integrity of historical data of data changes, and further resolve the technical problem that it is difficult to trace the historical data in the related data processing technology.

Optionally, the first obtaining unit 1102 may be configured to perform step S202, the storage unit 1104 may be configured to perform the foregoing step S204, and the clearing unit 1106 may be configured to perform step S206. Optional execution manners are not described herein.

In an optional implementation, the storage unit 1104 includes:

(1) a first storage module, configured to store target attribute values recorded in the same target column of a plurality of target rows to a dump transition page, the dump transition page being used for dumping attribute values recorded in the target column to the target pages in the column-oriented database; and (2) a second storage module, configured to store, in a case that the dump transition page is filled with all or some of the target attribute values recorded in the same target column of the plurality of target rows, attribute values recorded in the dump transition page to a third page in the target pages.

According to this embodiment, the target attribute values in the target column recorded in the dump transition page may be dumped when the dump transition page is full, to ensure that the page in the target pages is full and avoid a waste of a storage space.

In an optional implementation, the second storage module includes:

(1) a first determining submodule, configured to determine header information of the dump transition page, the header information being used for identifying an identification value range of target identifiers corresponding to the attribute values recorded in the dump transition page; and (2) a first storage submodule, configured to store the header information and the attribute values recorded in the dump transition page to the third page in the target pages.

Optionally, the header information includes: a maximum value and a minimum value of version identifiers corresponding to the attribute values recorded in the dump transition page, the target identifier being the version identifier, and the version identifiers being used for uniquely identifying column versions of target columns of the plurality of target rows. Alternatively, the header information includes: one or more key-value pairs, each key-value pair including an attribute value of a first column in a target column of the plurality of target rows and a page offset corresponding to the attribute value of the first column, the attribute value of the first column corresponding to a column version of an attribute value of a second column stored in the dump transition page, the attribute value of the first column and the attribute value of the second column being continuously stored in the dump transition page, and the page offset being an offset of a storage position of the attribute value of the second column in the dump transition page.

According to this embodiment, the header information is set, so as to form an index of the attribute values stored in the page in the column-oriented database, facilitating management of the target pages.

In an optional implementation, the second storage module includes:

(1) a second determining submodule, configured to determine an expected total amount of compressed data after data of each dump transition page in a plurality of dump transition pages is compressed in a target compression manner, each dump transition page in the plurality of dump transition pages storing attribute values corresponding to the same target column of the plurality of target rows, and the plurality of dump transition pages including the dump transition page in which the recorded attribute values are to be stored to the third page in the target pages;

(2) a compression submodule, configured to separately compress each dump transition page in the plurality of dump transition pages in the target compression manner in a case that the total amount of compressed data meets a target condition, to obtain total compressed data, the target condition being that: the total amount of compressed data is less than or equal to a target threshold, and the total amount of compressed data plus an amount of compressed data of one dump transition page is greater than the target threshold; and (3) a second storage submodule, configured to store the total compressed data to the third page in the target pages.

According to this embodiment, by estimating the total amount of compressed data after the attribute values in the plurality of dump transition pages corresponding to the same column in the target columns are compressed, when the total amount of compressed data is greater than the target threshold, the attribute values in the plurality of dump transition pages are stored in one of the target pages after being compressed, thereby saving the storage space.

In an optional implementation, the storage unit 1104 includes: a third storage module, configured to store target attribute values recorded in different target columns of a plurality of target rows to different pages in the target pages, and store, in a case that a first page in the target pages is filled with some target attribute values recorded in the same target column of the plurality of target rows, other target attribute values in the target attribute values recorded in the same target column of the plurality of target columns of the plurality of target rows, except the target attribute values that have been stored in the first page, to a second page in the target pages.

According to this embodiment, the target attribute values recorded in different target columns are stored in different pages in the target pages, and the attribute values recorded in the same target column may be stored in different pages, so that a storage mode of the attribute values of the target columns can be properly planned, to facilitate management of the target pages.

In an optional implementation, the foregoing apparatus further includes:

(1) a receiving unit, configured to receive, after the at least one target row is cleared, query information used for performing a data query on the data table;

(2) a second obtaining unit, configured to sequentially query the target pages in the column-oriented database and the data table in the row-oriented database by using the query information, to obtain a query result corresponding to the query information; and (3) an output unit, configured to output the query result.

According to this embodiment, the data table in the row-oriented database and the target page in the column-oriented database are separately queried by using the query information, so that the comprehensiveness of the query result is ensured.

In an optional implementation, the foregoing apparatus further includes:

(1) a first receiving unit, configured to receive, after the at least one target row is cleared, query information used for performing a data query on the data table;

(2) a first query unit, configured to sequentially query the target page in the column-oriented database, the data table in the row-oriented database, and the dump transition page by using the query information, to obtain a query result corresponding to the query information; and (3) a first output unit, configured to output the query result.

According to this embodiment, the data table in the row-oriented database, the target page in the column-oriented database, and the dump transition page are separately queried by using the query information, so that the comprehensiveness of the query result is ensured.

In an optional implementation solution, after the plurality of target rows are cleared, the apparatus further includes:

(1) a second receiving unit, configured to receive, after the at least one target row is cleared, query information used for performing a data query on the data table, the query information including a query value corresponding to the target identifier;

(2) a third obtaining unit, configured to obtain a row store index, a column store index, and the dump transition page, the row store index being an index of row store data stored in the data table in the row-oriented database, and the column store index being an index of identification values of target identifiers corresponding to attribute values of the plurality of target columns stored in each of the target pages;

(3) a second query unit, configured to: sequentially query the column store index, the row store index, and the dump transition page by using the query value, and determine a target position in which a query result corresponding to the query information is stored;

(4) a fourth obtaining unit, configured to obtain the query result corresponding to the query information by using the target position;

(5) a second output unit, configured to output the query result.

According to this embodiment, the column store index, the row store index, and the dump transition page are separately queried according to the query information including the query value corresponding to the target identifier, so that the query efficiency and the comprehensiveness of the query result are ensured.

Optionally, in this embodiment, a person of ordinary skill in the art can understand that all or some of the steps of the methods in the foregoing embodiments may be implemented by a program instructing relevant hardware of a terminal device. The program may be stored in a computer-readable storage medium, and the storage medium may include a flash drive, a read-only memory (ROM), a random access memory (RAM), a magnetic disk, a compact disc, and the like.

According to still another aspect of the embodiments of this application, a storage medium is further provided, the storage medium storing a computer program, the computer program being configured to perform steps in any one of the foregoing method embodiments when being run.

Optionally, in this embodiment, the foregoing storage medium may be configured to store a computer program used for performing the following steps:

S1. Obtain at least one target row to be cleared at a target time from a data table of a row-oriented database.

S2. Store target attribute values recorded in the at least one target row to target pages in a column-oriented database.

S3. Clear the at least one target row after the target time arrives.

Optionally, in this embodiment, a person of ordinary skill in the art can understand that all or some of the steps of the methods in the foregoing embodiments can be implemented by a program instructing relevant hardware of a terminal device. The program may be stored in a computer-readable storage medium, and the storage medium may include a flash drive, a read-only memory (ROM), a random access memory (RAM), a magnetic disk, a compact disc, and the like.

Figure 12:
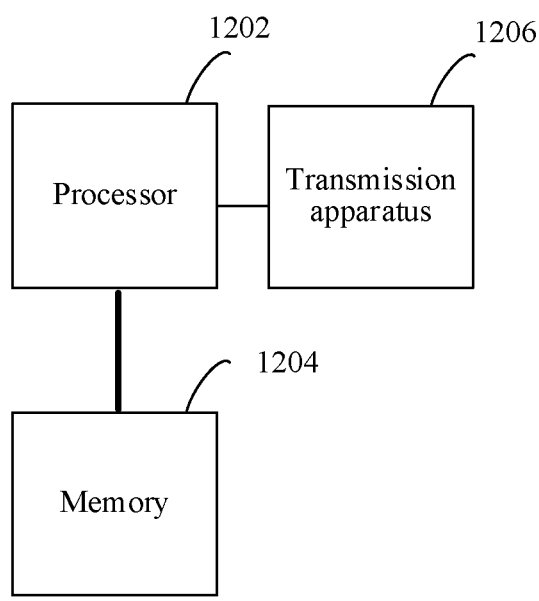
FIG. 12 is a schematic structural diagram of an optional electronic device according to an embodiment of this application.

According to still another aspect of the embodiments of this application, an electronic device configured to implement the foregoing data processing method is further provided. As shown in FIG. 12, the electronic device includes: a processor 1202, a memory 1204, and a transmission apparatus 1206. The memory stores a computer program. The processor is configured to perform steps in any one of the foregoing method embodiments by using the computer program.

Optionally, in this embodiment, the foregoing electronic device may be located in at least one of a plurality of network devices in a computer network.

Optionally, in this embodiment, the foregoing processor can be configured to perform, through the computer program, the following steps:

S1. Obtain at least one target row to be cleared at a target time from a data table of a row-oriented database.

S2. Store target attribute values recorded in the at least one target row to target pages in a column-oriented database.

S3. Clear the at least one target row after the target time arrives.

Optionally, a person of ordinary skill in the art can understand that, the structure shown in FIG. 12 is merely exemplary, and the electronic device may alternatively be a server that provides a query service. FIG. 12 does not constitute a limitation on the structure of the foregoing electronic device. For example, the electronic device may include more or fewer components (such as a network interface) than those shown in FIG. 12, or has a configuration different from that shown in FIG. 12.

The memory 1204 may be configured to store a software program and a module, for example, a program instruction/module corresponding to the data processing method and apparatus in the embodiments of this application. The processor 1202 runs the software program and the module stored in the memory 1204, to implement various functional applications and data processing, that is, implement the foregoing data processing method. The memory 1204 may include a high speed random access memory, and may further include a non-volatile memory, for example, one or more magnetic storage apparatuses, a flash memory, or another non-volatile solid-state memory. In some examples, the memory 1204 may further include memories remotely disposed relative to the processor 1202, and the remote memories may be connected to a terminal through a network. An example of the foregoing network includes, but is not limited to, the Internet, an intranet, a local area network, a mobile communications network, or a combination thereof.

The foregoing transmission apparatus 1206 is configured to receive or transmit data through a network. Specific examples of the foregoing network can include a wired network and a wireless network. In an example, the transmission apparatus 1206 includes a network interface controller (NIC) that can be connected to another network device and router by using a cable, to communicate with the Internet or a local area network. In an example, the transmission apparatus 1206 may be a radio frequency (RF for short) module, which is configured to communicate with the Internet in a wireless manner.

The sequence numbers of the foregoing embodiments of this application are merely for description purpose, and do not imply the preference among the embodiments.

In a case that the integrated unit in the foregoing embodiments is implemented in the form of a software function unit and sold or used as an independent product, the integrated unit can be stored in the foregoing computer-readable storage medium. Based on such an understanding, the technical solutions of this application essentially, or a part contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, it is to be understood that, the disclosed client may be implemented in another manner. The described apparatus embodiment is merely exemplary. For example, the unit division is merely logical function division and may be another division in actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

The foregoing descriptions are merely exemplary implementations of this application. A person of ordinary skill in the art may make several improvements and refinements without departing from the principle of this application, and all such improvements and refinements fall in the protection scope of this application.

What is claimed is:

1. A data processing method, applied to an electronic device having a processor and memory storing a plurality of programs to be executed by the processor, the method comprising:

obtaining a plurality of target rows to be cleared at a target time from a data table of a row-oriented database, wherein the plurality of target rows are historical data indicative of a plurality of historical versions of a user account's data in the data table of the row-oriented database accumulated before the target time;

storing target attribute values recorded in the plurality of target rows in target pages of a column-oriented database, including:

storing the target attribute values recorded in each one of different target columns of the plurality of target rows in a dump transition page associated with the particular target column in an internal memory of the electronic device, different target columns having different associated dump transition pages in the internal memory of the electronic device, wherein the dump transition page associated with the particular target column is used for dumping the target attribute values recorded in the particular target column to a respective one of the target pages of the column-oriented database located at an external storage device associated with the electronic device; and when the dump transition page is filled with the target attribute values recorded in the particular target column, migrating the target attribute values recorded in the dump transition page in the internal memory of the electronic device to the respective one of the target pages of the column-oriented database located at the external storage device associated with the electronic device;

clearing the plurality of target rows from the data table of the row-oriented database after the target time arrives;

receiving query information used for performing a data query on the data table;

sequentially querying the target pages of the column-oriented database and the data table of the row-oriented database by using the query information, to obtain a query result corresponding to the query information; and returning the query result.

2. The method according to claim 1, wherein the storing target attribute values recorded in the plurality of target rows in target pages in a column-oriented database comprises:

storing target attribute values recorded in different target columns of the plurality of target rows in different pages in the target pages, further including:

when a first page of the target pages is filled with some target attribute values recorded in a particular one of the different target columns of the plurality of target rows, storing other target attribute values recorded in the particular target column in a second page of the target pages.

3. The method according to claim 1, wherein the storing the target attribute values recorded in the dump transition page to one of the target pages comprises:

determining header information of the dump transition page, the header information being used for identifying an identification value range of target identifiers corresponding to the target attribute values recorded in the dump transition page; and storing the header information and the attribute values recorded in the dump transition page in the one of the target pages.

4. The method according to claim 3, wherein the header information comprises:

a maximum value and a minimum value of version identifiers corresponding to the attribute values recorded in the dump transition page, the target identifier being the version identifier, and the version identifier being used for uniquely identifying a column version of the target column of the plurality of target rows; and the header information comprises: one or more key-value pairs, each key-value pair comprising an attribute value of a first column in the target columns of the plurality of target rows and a page offset corresponding to the attribute value of the first column, the attribute value of the first column corresponding to a column version of an attribute value of a second column stored in the dump transition page, the attribute value of the first column and the attribute value of the second column being continuously stored in the dump transition page, and the page offset being an offset of a storage position of the attribute value of the second column in the dump transition page.

5. The method according to claim 1, wherein the storing the target attribute values recorded in the dump transition page to one of the target pages comprises:

determining an estimated total amount of compressed data after data of each dump transition page of a plurality of dump transition pages is compressed in a target compression manner, each dump transition page in the plurality of dump transition pages storing attribute values corresponding to the particular target column, and the plurality of dump transition pages comprising the dump transition page in which the recorded target attribute values are to be stored in the one of the target pages;

separately compressing each dump transition page of the plurality of dump transition pages in the target compression manner when the total amount of compressed data meets a target condition to obtain total compressed data, the target condition being that: the total amount of compressed data is less than or equal to a target threshold, and the total amount of compressed data plus an amount of compressed data of one dump transition page is greater than the target threshold; and storing the total compressed data in the one of the target pages.

6. An electronic device, comprising a processor and memory, the memory storing a plurality of programs that, when executed by the processor, cause the electronic device to perform a plurality of operations including:

obtaining a plurality of target rows to be cleared at a target time from a data table of a row-oriented database, wherein the plurality of target rows are historical data indicative of a plurality of historical versions of a user account's data in the data table of the row-oriented database accumulated before the target time;

storing target attribute values recorded in the plurality of target rows in target pages of a column-oriented database, including:

storing the target attribute values recorded in each one of different target columns of the plurality of target rows in a dump transition page associated with the particular target column in an internal memory of the electronic device, different target columns having different associated dump transition pages in the internal memory of the electronic device, wherein the dump transition page associated with the particular target column is used for dumping the target attribute values recorded in the particular target column to a respective one of the target pages of the column-oriented database located at an external storage device associated with the electronic device; and when the dump transition page is filled with the target attribute values recorded in the particular target column, migrating the target attribute values recorded in the dump transition page in the internal memory of the electronic device to the respective one of the target pages of the column-oriented database located at the external storage device associated with the electronic device;

clearing the plurality of target rows from the data table of the row-oriented database after the target time arrives;

receiving query information used for performing a data query on the data table;

sequentially querying the target pages of the column-oriented database and the data table of the row-oriented database by using the query information, to obtain a query result corresponding to the query information; and returning the query result.

7. The electronic device according to claim 6, wherein the storing target attribute values recorded in the plurality of target rows in target pages in a column-oriented database comprises:

storing target attribute values recorded in different target columns of the plurality of target rows in different pages in the target pages, further including:

when a first page of the target pages is filled with some target attribute values recorded in a particular one of the different target columns of the plurality of target rows, storing other target attribute values recorded in the particular target column in a second page of the target pages.

8. The electronic device according to claim 6, wherein the storing the target attribute values recorded in the dump transition page to one of the target pages comprises:

determining header information of the dump transition page, the header information being used for identifying an identification value range of target identifiers corresponding to the target attribute values recorded in the dump transition page; and storing the header information and the attribute values recorded in the dump transition page in the one of the target pages.

9. The electronic device according to claim 8, wherein the header information comprises:

a maximum value and a minimum value of version identifiers corresponding to the attribute values recorded in the dump transition page, the target identifier being the version identifier, and the version identifier being used for uniquely identifying a column version of the target column of the plurality of target rows; and the header information comprises: one or more key-value pairs, each key-value pair comprising an attribute value of a first column in the target columns of the plurality of target rows and a page offset corresponding to the attribute value of the first column, the attribute value of the first column corresponding to a column version of an attribute value of a second column stored in the dump transition page, the attribute value of the first column and the attribute value of the second column being continuously stored in the dump transition page, and the page offset being an offset of a storage position of the attribute value of the second column in the dump transition page.

10. The electronic device according to claim 6, wherein the storing the target attribute values recorded in the dump transition page to one of the target pages comprises:

determining an estimated total amount of compressed data after data of each dump transition page of a plurality of dump transition pages is compressed in a target compression manner, each dump transition page in the plurality of dump transition pages storing attribute values corresponding to the particular target column, and the plurality of dump transition pages comprising the dump transition page in which the recorded target attribute values are to be stored in the one of the target pages;

separately compressing each dump transition page of the plurality of dump transition pages in the target compression manner when the total amount of compressed data meets a target condition to obtain total compressed data, the target condition being that: the total amount of compressed data is less than or equal to a target threshold, and the total amount of compressed data plus an amount of compressed data of one dump transition page is greater than the target threshold; and storing the total compressed data in the one of the target pages.

11. A non-transitory computer-readable storage medium, storing a plurality of programs that, when executed by a processor of an electronic device, cause the electronic device to perform a plurality of operations including:

obtaining a plurality of target rows to be cleared at a target time from a data table of a row-oriented database, wherein the plurality of target rows are historical data indicative of a plurality of historical versions of a user account's data in the data table of the row-oriented database accumulated before the target time;

storing target attribute values recorded in the plurality of target rows in target pages of a column-oriented database, including:

storing the target attribute values recorded in each one of different target columns of the plurality of target rows in a dump transition page associated with the particular target column in an internal memory of the electronic device, different target columns having different associated dump transition pages in the internal memory of the electronic device, wherein the dump transition page associated with the particular target column is used for dumping the target attribute values recorded in the particular target column to a respective one of the target pages of the column-oriented database located at an external storage device associated with the electronic device; and when the dump transition page is filled with the target attribute values recorded in the particular target column, migrating the target attribute values recorded in the dump transition page in the internal memory of the electronic device to the respective one of the target pages of the column-oriented database located at the external storage device associated with the electronic device;

clearing the plurality of target rows from the data table of the row-oriented database after the target time arrives;

receiving query information used for performing a data query on the data table;

sequentially querying the target pages of the column-oriented database and the data table of the row-oriented database by using the query information, to obtain a query result corresponding to the query information; and returning the query result.

12. The non-transitory computer-readable storage medium according to claim 11, wherein the storing target attribute values recorded in the plurality of target rows in target pages in a column-oriented database comprises:

storing target attribute values recorded in different target columns of the plurality of target rows in different pages in the target pages, further including:

when a first page of the target pages is filled with some target attribute values recorded in a particular one of the different target columns of the plurality of target rows, storing other target attribute values recorded in the particular target column in a second page of the target pages.

13. The non-transitory computer-readable storage medium according to claim 11, wherein the storing the target attribute values recorded in the dump transition page to one of the target pages comprises:

determining header information of the dump transition page, the header information being used for identifying an identification value range of target identifiers corresponding to the target attribute values recorded in the dump transition page; and storing the header information and the attribute values recorded in the dump transition page in the one of the target pages.

14. The non-transitory computer-readable storage medium according to claim 13, wherein the header information comprises:

a maximum value and a minimum value of version identifiers corresponding to the attribute values recorded in the dump transition page, the target identifier being the version identifier, and the version identifier being used for uniquely identifying a column version of the target column of the plurality of target rows; and the header information comprises: one or more key-value pairs, each key-value pair comprising an attribute value of a first column in the target columns of the plurality of target rows and a page offset corresponding to the attribute value of the first column, the attribute value of the first column corresponding to a column version of an attribute value of a second column stored in the dump transition page, the attribute value of the first column and the attribute value of the second column being continuously stored in the dump transition page, and the page offset being an offset of a storage position of the attribute value of the second column in the dump transition page.

15. The non-transitory computer-readable storage medium according to claim 11, wherein the storing the target attribute values recorded in the dump transition page to one of the target pages comprises:

determining an estimated total amount of compressed data after data of each dump transition page of a plurality of dump transition pages is compressed in a target compression manner, each dump transition page in the plurality of dump transition pages storing attribute values corresponding to the particular target column, and the plurality of dump transition pages comprising the dump transition page in which the recorded target attribute values are to be stored in the one of the target pages;

separately compressing each dump transition page of the plurality of dump transition pages in the target compression manner when the total amount of compressed data meets a target condition to obtain total compressed data, the target condition being that: the total amount of compressed data is less than or equal to a target threshold, and the total amount of compressed data plus an amount of compressed data of one dump transition page is greater than the target threshold; and storing the total compressed data in the one of the target pages.

\* \* \* \* \*